United States Patent
Sun et al.

(10) Patent No.: US 10,856,294 B2
(45) Date of Patent: Dec. 1, 2020

(54) DEVICE-TO-DEVICE DATA TRANSMISSION METHOD, APPARATUS, AND SYSTEM

(71) Applicant: Huawei Technologies Co., Ltd., Shenzhen (CN)

(72) Inventors: Yinghua Sun, Shenzhen (CN); Chao Li, Beijing (CN); Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/363,514

(22) Filed: Mar. 25, 2019

(65) Prior Publication Data

US 2019/0223179 A1 Jul. 18, 2019

Related U.S. Application Data

(63) Continuation of application No. PCT/CN2016/100175, filed on Sep. 26, 2016.

(51) Int. Cl.
*H04W 72/04* (2009.01)
*H04W 4/46* (2018.01)
*H04W 72/12* (2009.01)
*H04W 72/10* (2009.01)
*H04W 28/02* (2009.01)
(Continued)

(52) U.S. Cl.
CPC ......... *H04W 72/0446* (2013.01); *H04W 4/40* (2018.02); *H04W 4/46* (2018.02); *H04W 28/0231* (2013.01); *H04W 72/10* (2013.01); *H04W 72/1278* (2013.01); *H04L 67/12* (2013.01); *H04W 28/26* (2013.01)

(58) Field of Classification Search
None
See application file for complete search history.

(56) References Cited

U.S. PATENT DOCUMENTS 10,075,972 B2 * 9/2018 Chae ................. H04W 72/1289
2013/0308549 A1 * 11/2013 Madan ................. H04W 28/26
370/329
(Continued)

FOREIGN PATENT DOCUMENTS

CN 103118336 A 5/2013
CN 104769998 A 7/2015
(Continued)

OTHER PUBLICATIONS

"Discussion on V2V Semi-Persistent Scheduling procedure," 3GPP TSG RAN WG1 Meeting #84bis, Busan, Korea, R1-163154, XP051079778, 3rd Generation Partnership Project, Valbonne, France (Apr. 11-15, 2016).
(Continued)

*Primary Examiner* — Brian S Roberts
(74) *Attorney, Agent, or Firm* — Leydig, Voit & Mayer, Ltd.

(57) ABSTRACT

A device-to-device data transmission method includes: performing signal detection on a first resource subset of a resource set used for data transmission, where a resource on which the signal detection is performed is less than the resource set; determining an available resource in the resource set based on a signal detection result; and transmitting to-be-transmitted data by selecting a resource from the available resource.

18 Claims, 16 Drawing Sheets

(51) Int. Cl.
*H04W 4/40* (2018.01)
*H04L 29/08* (2006.01)
*H04W 28/26* (2009.01)

(56) References Cited

U.S. PATENT DOCUMENTS

| | | | |
|---|---|---|---|
| 2014/0133845 A1 | 5/2014 | Dahlfort et al. | |
| 2014/0313932 A1 | 10/2014 | Saltsidis | |
| 2017/0064733 A1* | 3/2017 | Lee | H04W 72/1278 |
| 2018/0270822 A1* | 9/2018 | Chae | H04W 72/0453 |

FOREIGN PATENT DOCUMENTS

| | | |
|---|---|---|
| CN | 105308915 A | 2/2016 |
| CN | 105634847 A | 6/2016 |
| EP | 3484204 A1 | 5/2019 |
| WO | 2015032436 A1 | 3/2015 |
| WO | 2015115505 A1 | 8/2015 |

OTHER PUBLICATIONS

"On Sensing Design Details for Sidelink V2V Communication," 3GPP TSG RAN WG1 Meeting #84bis, Busan, Korea, R1-162363, XP051080142, 3rd Generation Partnership Project, Valbonne, France (Apr. 11-15, 2016).

"Discussion on SA content," 3GPP TSG RAN WG1 Meeting #85, Nanjing, China, R1-164966, XP051096797, 3rd Generation Partnership Project, Valbonne, France (May 23-27, 2016).

"3rd Generation Partnership Project; Technical Specification Group Radio Access Network; Evolved Universal Terrestrial Radio Access (E-UTRA); Physical layer procedures (Release 13)," 3GPP TS 36.213 V13.2.0, pp. 1-381,3rd Generation Partnership Project—Valbonne, France (Jun. 2016).

"Details of sensing procedure and resource (re)selection triggering mechanisms," 3GPP TSG RAN WG1 Meeting #86, Gothenburg, Sweden, R1-166169, pp. 1-6, 3rd Generation Partnership, Valbonne, France (Aug. 22-26, 2016).

"Chairman's Notes of Agenda Item 7.2.2 on Support for V2V services based on LTE sidelink," 3GPP TSG RAN WG1 Meeting #86, Gothenburg, Sweden, R1-168403, pp. 1-11, 3rd Generation Partnership, Valbonne, France (Aug. 22-26, 2016).

"Transmitter UE behaviour for sensing-based resource allocation," 3GPP TSG RAN WG1 Meeting #85, Nanjing, China, R1-165192, pp. 1-7, 3rd Generation Partnership, Valbonne, France (May 23-27, 2016).

"Details for supporting traffic with smaller periodicity on PC5 based V2V," 3GPP TSG RAN WG1 Meeting #86bis, Lisbon, Portugal, R1-1609365, pp. 1-3, 3rd Generation Partnership, Valbonne, France (Oct. 10-14, 2016).

JP/2019515934, Office Action, dated May 26, 2020.

* cited by examiner

DEVICE-TO-DEVICE DATA TRANSMISSION METHOD, APPARATUS, AND SYSTEM

CROSS-REFERENCE TO RELATED APPLICATIONS

This application is a continuation of International Application No. PCT/CN2016/100175, filed on Sep. 26, 2016. The disclosure of the aforementioned application is hereby incorporated by reference in its entirety.

TECHNICAL FIELD

The present invention relates to the communications field, and in particular, to a device-to-device data transmission method, apparatus, and system.

BACKGROUND

A vehicle-to-vehicle communications (V2V) technology is a communications technology disclosed in the communications standard Rel-14. The V2V technology has been widely applied to production and life of people. In other words, a vehicle (a first device) and another vehicle (a second device) can communicate with each other.

In the V2V technology, when the first device needs to communicate with the second device, the first device needs to first perform, in a preset time period, signal detection on an entire resource set that is used for data transmission, and determines an available transmission resource in the resource set based on a signal detection result. Then, the first device can transmit data to the second device on the determined available transmission resource.

With development of communications technologies, a vehicle-to-pedestrian communications (V2P) technology has been proposed. A vehicle and a handheld device can communicate with each other by using the technology. Currently, a communications principle same as that of the V2V technology is to be used for the V2P technology. However, in the V2P technology, the handheld device needs to consume a relatively large amount of energy if the handheld device also performs, before sending data, signal detection on an entire resource set that is used for data transmission, and consequently, relatively long-time normal use of the handheld device cannot be ensured.

SUMMARY

To resolve a problem of failing to ensure relatively long-time normal use of a handheld device, the present invention provides a device-to-device data transmission method, apparatus, and system.

According to a first aspect, a device-to-device data transmission method is provided, where the device-to-device data transmission method is used for a communications device and includes: performing signal detection on a first resource subset of a resource set used for data transmission, where a resource on which the signal detection is performed is less than the resource set; determining an available resource in the resource set based on a signal detection result; and transmitting to-be-transmitted data by selecting a resource from the available resource.

Before the to-be-transmitted data is transmitted, signal detection is performed only on the first resource subset of the entire resource set, and the available resource in the resource set can be determined based on the signal detection result; and during data transmission, the to-be-transmitted data can be transmitted by directly selecting the resource from the available resource. In other words, in this embodiment of the present invention, the communications device does not perform detection on the entire resource set that is used for transmission, so that the communications device does not need to consume a relatively large amount of energy during detection. Therefore, when the communications device is a handheld device, relatively long-time normal use of the handheld device can be ensured.

Optionally, the resource set is divided into N initial sets, each initial set includes at least one first resource subset, and N is an integer greater than or equal to 1. Optionally, each initial set includes at least two first resource subsets, and time domain intervals between any two adjacent first resource subsets of the at least two first resource subsets are equal. Optionally, each initial set includes at least two first resource subsets, and all time domain intervals between two adjacent first resource subsets in each initial set are an arithmetic sequence. Optionally, the resource set includes at least two first resource subsets, and all time domain intervals between two adjacent first resource subsets are an arithmetic sequence.

Optionally, the resource set is divided into N initial sets, and when N is an integer greater than or equal to 2, time domain sizes of any two initial sets are the same or different.

The present invention enumerates an example with four distribution statuses of first resource subsets in the resource set. In an actual application, there may be another distribution status of the first resource subsets, and the present invention imposes no limitation thereto. In the foregoing four distribution statuses, because a sum of all the first resource subsets is less than the resource set, compared with detection on the entire resource set in a related technology, a detection range is significantly reduced, a detection speed is enhanced, and energy consumption required by detection is reduced.

Optionally, the determining an available resource in the resource set based on a signal detection result includes: determining at least one second resource subset of the resource set as a candidate resource; and determining an available resource in the candidate resource as the available resource in the resource set based on the signal detection result, where a time domain interval between each second resource subset and the first resource subset is a positive integer multiple of a target period, and the target period is determined based on a signal energy value of the first resource subset or a priority of the to-be-transmitted data; or a time domain interval between each second resource subset and the first resource subset is a positive integer multiple of a preset period. Optionally, a larger signal energy value indicates a larger target period, and a smaller signal energy value indicates a smaller target period; or a higher priority of the to-be-transmitted data indicates a smaller target period, and a lower priority of the to-be-transmitted data indicates a larger target period; or a larger signal energy value indicates a smaller time domain length of the second resource subset, and a smaller signal energy value indicates a larger time domain length of the second resource subset; or a higher priority of the to-be-transmitted data indicates a larger time domain length of the second resource subset, and a lower priority of the to-be-transmitted data indicates a smaller time domain length of the second resource subset.

Specifically, a larger signal energy value of the first resource subset indicates more resources occupied in the first resource subset, a larger possibility of occupying a resource close to the first resource subset, and a smaller possibility of occupying a resource far away from the first resource subset. Therefore, during determining of the target period based on the signal energy value of the first resource subset, in a case of a larger signal energy value of the first resource subset, a larger target period may be determined and the length of the second resource subset is smaller, so that it is ensured that there are a relatively large quantity of first available resources in the determined candidate resource.

Optionally, the determining an available resource in the resource set based on a signal detection result includes: determining a first parameter K based on the signal energy value or a priority of the to-be-transmitted data, where the first parameter K is an integer greater than or equal to zero; determining a third resource subset on at least one side of the first resource subset as a candidate resource, where the third resource subset includes K consecutive subframes or K consecutive symbols, and is adjacent to the first resource subset; and determining an available resource in the candidate resource as the available resource in the resource set based on the signal detection result. Optionally, a larger signal energy value indicates a smaller first parameter K; or a smaller signal energy value indicates a larger first parameter K; or a higher priority of the to-be-transmitted data indicates a smaller first parameter K; or a lower priority of the to-be-transmitted data indicates a larger first parameter K.

Specifically, a larger signal energy value of the first resource subset indicates more resources occupied in the first resource subset, a larger possibility of occupying a resource close to the first resource subset, and a smaller possibility of occupying a resource far away from the first resource subset. Therefore, during determining of the first parameter K based on the signal energy value of the first resource subset, in a case of a larger signal energy value of the first resource subset, a smaller first parameter K may be determined, and in a case of a smaller signal energy value of the first resource subset, a larger first parameter K is determined, so that it is ensured that there are a relatively large quantity of first available resources in the determined candidate resource.

Optionally, the determining an available resource in the resource set based on a signal detection result includes: obtaining a preset first parameter K, where the first parameter K is an integer greater than or equal to zero; determining a third resource subset on at least one side of the first resource subset as a candidate resource, where the third resource subset includes K consecutive subframes or K consecutive symbols, and is adjacent to the first resource subset; and determining an available resource in the candidate resource as the available resource in the resource set based on the signal detection result. In other words, the first parameter K may alternatively be directly configured by a base station or another higher layer for the communications device, and the present invention imposes no limitation thereto.

Optionally, the signal detection result is a signal energy value of the first resource subset, a one-to-one correspondence between at least one set in the resource set and at least one probability value is configured on the communications device, and the determining an available resource in the resource set based on a signal detection result includes: when the signal energy value is less than a preset threshold, determining the first resource subset as the available resource in the resource set based on the signal detection result; or when the signal energy value is not less than the preset threshold, selecting a probability value from the at least one probability value as an available probability value, and using a resource in a set corresponding to the available probability value as a candidate resource; and determining an available resource in the candidate resource as the available resource in the resource set based on the signal detection result.

Optionally, the transmitting to-be-transmitted data by selecting a resource from the available resource includes: transmitting first to-be-transmitted data by selecting an available resource from a first available resource; and after the transmitting to-be-transmitted data by selecting a resource from the available resource, the method further includes: during transmission of an $(X+1)^{th}$ piece of to-be-transmitted data, performing $(X+1)^{th}$ signal detection on the first resource subset in the resource set, where X is an integer greater than or equal to 1; determining a second available resource in the resource set based on a signal detection result of the $(X+1)^{th}$ signal detection and at least one of signal detection results of first X signal detections that are performed during transmission of first X pieces of to-be-transmitted data; and transmitting the $(X+1)^{th}$ piece of to-be-transmitted data by selecting a resource from the second available resource.

In other words, during determining of the available resource each time, the available resource may be determined with reference to previous detection results, so that the previous detection results may serve as a reference for determining the available resource this time, thereby improving accuracy of the available resource determined this time.

Optionally, the signal detection result is a signal energy value of the first resource subset, and the performing signal detection on a first resource subset of a resource set used for data transmission includes: obtaining first scheduling assignment (SA) information, where the first SA information indicates a first resource that is used for data transmission, and the first resource belongs to the first resource subset; and determining whether the first SA information indicates existence of a reserved resource; and the determining an available resource in the resource set based on a signal detection result includes: determining the first resource as a candidate resource when the first SA information indicates that no reserved resource exists; and determining an available resource in the candidate resource as the available resource in the resource set based on the signal detection result.

Optionally, the determining the first resource as a candidate resource when the first SA information indicates that no reserved resource exists includes: when the signal energy value is not less than a preset threshold, and the first SA information indicates that no reserved resource exists, determining an available resource in the first resource subset and the first resource as candidate resources, and determining an available resource in the candidate resources as the available resource in the resource set based on the signal detection result.

In other words, when the first SA information indicates that no reserved resource exists, the communications device may directly determine the first resource as the candidate resource, and determine the available resource in the candidate resource as the available resource in the resource set based on the signal detection result.

Optionally, the performing signal detection on a first resource subset of a resource set used for data transmission includes: performing signal detection on a $U^{th}$ first resource subset, where U is an integer greater than or equal to 1; obtaining second SA information transmitted on the $U^{th}$ first resource subset; determining whether the second SA information indicates existence of a reserved resource; when the second SA information indicates existence of a reserved resource, determining a first resource subset to which the reserved resource belongs; and during signal detection on the first resource subset to which the reserved resource belongs, performing signal detection on a resource, other than the reserved resource, in the first resource subset to which the reserved resource belongs.

In other words, when it is determined that a to-be-detected first resource subset includes a reserved resource, it may be considered by default that, the reserved resource is an unavailable resource if a signal energy value of the reserved resource is relatively great when signal detection is performed on the first resource subset. A quantity of resources that are included in signal detection is further reduced, and energy that needs to be consumed by the communications device during data transmission is reduced.

According to a second aspect, a device-to-device data transmission method is provided, where the device-to-device data transmission method is used for a communications device and includes: performing signal detection on a transmission resource, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is less than a first numerical value; and when the first candidate resources are greater than L times of the transmission resource, transmitting to-be-transmitted data by selecting an available resource from the first candidate resources. Optionally, the first numerical value is equal to 0.2.

Before the to-be-transmitted data is transmitted, when it is determined whether the first candidate resources are greater than L times of the transmission resource, L is less than 0.2 in a related technology, that is, L is less than 20% in the related technology. Therefore, a requirement that the first candidate resources are greater than L times of the transmission resource is greatly improved, and a probability of performing a step of adjusting a threshold and re-determining a candidate resource when the first candidate resources are not greater than L times of the transmission resource is reduced. Therefore, steps that need to be performed in a data transmission process are reduced, energy consumption of the communications device is reduced, and when the communications device is a handheld device, relatively long-time normal use of the handheld device can be ensured.

According to a third aspect, a device-to-device data transmission method is provided, where the device-to-device data transmission method is used for a communications device and includes: performing signal detection on a transmission resource, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is equal to a first numerical value; when the first candidate resources are greater than L times of the transmission resource, transmitting to-be-transmitted data by selecting an available resource from the first candidate resources; and when the first candidate resources are not greater than L times of the transmission resource, increasing a preset threshold corresponding to each third resource by M, to obtain a target threshold corresponding to each third resource, where M is greater than a second numerical value; determining the second resource and a third resource whose SA information is successfully decoded and whose signal energy value is less than the corresponding target threshold as second candidate resources; determining whether the second candidate resources are greater than L times of the transmission resource; and when the second candidate resources are greater than L times of the transmission resource, transmitting the to-be-transmitted data by selecting an available resource from the second candidate resources. Optionally, L is equal to 0.2, and the second numerical value is equal to 3 dB.

Because M is greater than a step value of 3 dB in a related technology, a requirement that the re-determined second candidate resources are greater than L times of the transmission resource is greatly improved, steps that need to be performed in a data transmission process are reduced, and energy consumption of the communications device is reduced. Therefore, when the communications device is a handheld device, relatively long-time normal use of the handheld device can be ensured.

According to a fourth aspect, a device-to-device data transmission method is provided, where the device-to-device data transmission method is used for a communications device and includes: determining reservation information, where the reservation information indicates that an available frequency domain resource of to-be-transmitted data is reserved for at least twice; and transmitting the to-be-transmitted data based on the reservation information.

It should be noted that, the reservation information may be used to indicate that the available frequency domain resource of the to-be-transmitted data is reserved for at least twice. In a related technology, SA information sent by V-UE (also referred to as an in-vehicle device) can be merely used to indicate that an available frequency domain resource of to-be-transmitted data is reserved for once. However, for P-UE (also referred to as a handheld device), to reduce power consumption and reduce data transmission complexity, a quantity of resource reservation times of the P-UE may be set to at least twice, for example, five times. In this way, the P-UE can successively send five data packets on a currently selected frequency domain resource.

According to a fifth aspect, a device-to-device data transmission method is provided, where the device-to-device data transmission method is used for a communications device and includes: determining reservation information, where the reservation information indicates a factor of a reservation period length; and transmitting to-be-transmitted data based on the reservation information. The reservation period length is greater than a third numerical value. Optionally, the third numerical value is equal to a reservation period length in a vehicle-to-vehicle communications (V2V) technology. In other words, an objective of reducing P-UE power consumption is achieved by increasing the reservation period length.

Optionally, the reservation information is indicated by using scheduling assignment SA information, or the reservation information is indicated by using radio resource control (RRC) signaling, or the reservation information is configured by a base station or a higher layer for the communications device.

Optionally, the factor of the reservation period length includes a parameter i, where i is greater than or equal to a fourth numerical value. At least one of first bit signaling and second bit signaling in the SA information indicates the parameter i, where the first bit signaling is bit signaling that is in SA information in the V2V technology and that indicates the parameter i, and the second bit signaling belongs to reserved bit signaling in the SA information. Optionally, the fourth numerical value is equal to 10.

Optionally, the factor of the reservation period length includes a parameter P, where P is greater than or equal to a fifth numerical value. The SA information or the RRC signaling indicates the parameter P, a parameter P in SA information of to-be-transmitted data with a different priority is different, or a parameter P in SA information of to-be-transmitted data of a different type of communications device is different, and the communications device may be P-UE and V-UE. The fifth numerical value is equal to 100.

Optionally, the factor of the reservation period length includes a parameter Q, the communications device may be P-UE and V-UE, a parameter Q of to-be-transmitted data of the P-UE is greater than 1, and a parameter Q of to-be-transmitted data of the V-UE is equal to 1.

According to a sixth aspect, a device-to-device data transmission method is provided, where the device-to-device data transmission method is used for a communications device and includes: determining reservation information, where the reservation information indicates a factor of a reservation period length; and transmitting to-be-transmitted data based on the reservation information.

Optionally, the factor of the reservation period length includes a parameter i, where i is greater than 0 and less than 1. At least one of first bit signaling and second bit signaling in SA information indicates the parameter i, where the first bit signaling is bit signaling that is in SA information in a V2V technology and that indicates the parameter i, and the second bit signaling belongs to reserved bit signaling in the SA information.

Optionally, the factor of the reservation period length includes a parameter P, where P is less than 100. The SA information or RRC signaling indicates the parameter P. Optionally, the parameter P is related to a priority of the to-be-transmitted data; or the parameter P is related to a service period of the to-be-transmitted data; or the parameter P is related to a transmission delay of the to-be-transmitted data.

Optionally, the factor of the reservation period length includes a parameter Q, where Q is greater than 0 and less than 1.

Optionally, the reservation information is indicated by using scheduling assignment SA information, or the reservation information is indicated by using RRC signaling, or the reservation information is configured by a base station or a higher layer for the communications device.

According to a seventh aspect, a device-to-device data transmission method is provided, where the device-to-device data transmission method is used for a communications device and includes: performing signal detection on a transmission resource, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is equal to a first numerical value; when the first candidate resources are greater than L times of the transmission resource, transmitting to-be-transmitted data by selecting a resource from the first candidate resources; determining whether a reselection condition is met; and when the reselection condition is met, transmitting the to-be-transmitted data by reselecting a resource from the first candidate resources. Optionally, the determining whether a reselection condition is met includes: determining whether transmission duration of the to-be-transmitted data is greater than or equal to preset duration; and when the transmission duration is less than the preset duration, determining that the reselection condition is not met; or when the transmission duration is greater than or equal to the preset duration, selecting a probability value from at least one preset reselection probability value as a target reselection probability value, and determining whether the reselection condition is met based on the target reselection probability value. Optionally, L is equal to 0.2. A preset range is [0, 0.8], a sixth numerical value is 0, and a seventh numerical value is 5.

Optionally, the value range of the at least one preset reselection probability value is in a preset range.

Optionally, a minimum probability value in the at least one preset reselection probability value is greater than the sixth numerical value.

Optionally, a quantity of preset reselection probability values is less than the seventh numerical value.

The value range of the at least one preset reselection probability value is in [0, 0.8], the minimum probability value in the at least one preset reselection probability value is greater than 0, and the quantity of preset reselection probability values is less than 5. In other words, a probability of skipping resource reselection is increased, and a probability of resource reselection is reduced. Therefore, steps that need to be performed by a handheld device in a data transmission process are reduced, and energy consumption of the handheld device is reduced.

According to an eighth aspect, a device-to-device data transmission method is provided, where the device-to-device data transmission method is used for a communications device and includes: performing signal detection on a transmission resource in a time period greater than one second, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is equal to a first numerical value; and when the first candidate resources are greater than L times of the transmission resource, transmitting to-be-transmitted data by selecting an available resource from the first candidate resources. Optionally, L is equal to 0.2.

In a related technology, a time domain length of a time period (also referred to as a sensing window) for transmission resource detection is one second. P-UE has a larger data packet transmission period and lower transmission frequency. Therefore, to ensure data transmission reliability, a length of a sensing window of the P-UE correspondingly becomes greater, for example, greater than one second, so that the P-UE can perform resource detection and selection on more resources, thereby ensuring data transmission reliability.

According to a ninth aspect, a device-to-device data transmission method is provided, where the device-to-device data transmission method is used for a communications device and includes: performing signal detection on a transmission resource, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is equal to a first numerical value; and when the first candidate resources are greater than L times of the transmission resource, transmitting to-be-transmitted data by selecting an available resource from the first candidate resources. A detection energy threshold corresponding to any two of at least two data priorities is configured on the communications device, a preset threshold corresponding to a resource is a detection energy threshold corresponding to a priority of data being transmitted on the resource and a priority of the to-be-transmitted data, the communications device may be P-UE and V-UE, and a priority of to-be-transmitted data of the P-UE is higher than or equal to a priority of to-be-transmitted data of the V-UE. A priority of first to-be-transmitted data of the P-UE is a first priority, a priority of second to-be-transmitted data of the V-UE is a second priority, a third priority is different from the first priority and the second priority, the first priority and the third priority are corresponding to a first detection energy threshold, the second priority and the third priority are corresponding to a second detection energy threshold, and the first detection energy threshold is greater than or equal to the second detection energy threshold. Optionally, L is equal to 0.2.

The priority of the to-be-transmitted data of the P-UE is higher than the priority of the to-be-transmitted data of the V-UE, and the first detection energy threshold is greater than the second detection energy threshold. Therefore, a size of an available resource determined by the P-UE is increased, a probability of determining that there is an available resource is increased, data transmission efficiency is improved, and energy consumption of the P-UE is reduced.

Optionally, SA information of the to-be-transmitted data indicates a type of the communications device, priorities of to-be-transmitted data of all P-UEs are the same, and are all higher than a priority of to-be-transmitted data of any V-UE, and the first detection energy threshold is greater than the second detection energy threshold.

Optionally, SA information of the to-be-transmitted data indicates a priority of each piece of to-be-transmitted data, a priority of each type of to-be-transmitted data is different, a priority of to-be-transmitted data of each P-UE is higher than a priority of to-be-transmitted data of any V-UE, and the first detection energy threshold is greater than the second detection energy threshold.

Optionally, SA information of the to-be-transmitted data indicates a priority of each piece of to-be-transmitted data, a priority of to-be-transmitted data of first P-UE is the same as a priority of to-be-transmitted data of V-UE, a priority of to-be-transmitted data of second P-UE is higher than the priority of the to-be-transmitted data of the V-UE, when the priority of the to-be-transmitted data of the first P-UE is the first priority, the first detection energy threshold is equal to the second detection energy threshold, and when the priority of the to-be-transmitted data of the second P-UE is the first priority, the first detection energy threshold is greater than the second detection energy threshold.

Optionally, SA information of the to-be-transmitted data indicates a priority of each piece of to-be-transmitted data, a priority of each type of to-be-transmitted data is different, and when a type of to-be-transmitted data of P-UE is the same as a type of to-be-transmitted data of V-UE, a priority of the to-be-transmitted data of the P-UE is higher than a priority of the to-be-transmitted data of the V-UE.

According to a tenth aspect, a device-to-device data transmission method is provided, where the device-to-device data transmission method is used for a communications device and includes: performing signal detection on a transmission resource, where the transmission resource is a resource set that is used for data transmission, or the transmission resource is a first resource subset in the resource set; determining a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold; determining whether the first candidate resources are greater than L times of the transmission resource, where L is equal to a first numerical value; and when the first candidate resources are greater than L times of the transmission resource, transmitting to-be-transmitted data with Y repetitions by selecting an available resource from the first candidate resource, where Y is greater than an eighth numerical value. Optionally, L is equal to 0.2, and the eighth numerical value is equal to 2.

In other words, in this embodiment of the present invention, the number of repetitions is greater than 2 in a related technology. Therefore, data transmission reliability can be further improved.

Optionally, during each repetition prior to $Y^{th}$ repetition, a time interval between this repetition and next repetition is indicated in SA information, and during the $Y^{th}$ repetition, a time interval between the $Y^{th}$ repetition and at least one repetition prior to the $Y^{th}$ repetition is indicated in SA information.

Optionally, the Y repetitions are grouped into Z groups of repetitions, where Z is an integer greater than or equal to 2, the number of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition and a time interval between the last repetition and first repetition in a next group of repetitions are indicated in SA information.

Optionally, the Y repetitions are grouped into Z groups of repetitions, where Z is an integer greater than or equal to 2, the number of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition is indicated in SA information; in each group of repetitions that is not a first group of repetitions, during first repetition, a time interval between the first repetition and last repetition in a previous group of repetitions is indicated in SA information; and in each group of repetitions that is not a last group of repetitions, during last repetition, a time interval between the last repetition and first repetition in a next group of repetitions is indicated in SA information.

Optionally, a time interval between every two adjacent groups of repetitions is configured by a base station for the communications device, or RRC signaling indicates a time interval between every two adjacent groups of repetitions.

It should be noted that, the second aspect to the tenth aspect may be integrated randomly, for beneficial effects of an integrated aspect, refer to beneficial effects of aspects that are integrated, and details are not described herein in this embodiment of the present invention.

According to an eleventh aspect, a device-to-device data transmission apparatus is provided, where the device-to-device data transmission apparatus is used for a communications device and includes at least one module, and the at least one module is configured to implement: the data transmission method in any one of the first aspect or possible implementations of the first aspect; or the data transmission method in any one of the second aspect or possible implementations of the second aspect; or the data transmission method in any one of the third aspect or possible implementations of the third aspect; or the data transmission method in any one of the fourth aspect or possible implementations of the fourth aspect; or the data transmission method in any one of the fifth aspect or possible implementations of the fifth aspect; or the data transmission method in any one of the sixth aspect or possible implementations of the sixth aspect; or the data transmission method in any one of the seventh aspect or possible implementations of the seventh aspect; or the data transmission method in any one of the eighth aspect or possible implementations of the eighth aspect; or the data transmission method in any one of the ninth aspect or possible implementations of the ninth aspect; or the data transmission method in any one of the tenth aspect or possible implementations of the tenth aspect.

According to a twelfth aspect, a device-to-device data transmission apparatus is provided, where the device-to-device data transmission apparatus is used for a communications device and includes: at least one processor, at least one network interface, a memory, and at least one bus; the memory and the network interface are separately connected to the processor by using the bus; the processor is configured to execute an instruction stored in the memory; and the processor executes the instruction to implement: the data transmission method in any one of the first aspect or possible implementations of the first aspect; or the data transmission method in any one of the second aspect or possible implementations of the second aspect; or the data transmission method in any one of the third aspect or possible implementations of the third aspect; or the data transmission method in any one of the fourth aspect or possible implementations of the fourth aspect; or the data transmission method in any one of the fifth aspect or possible implementations of the fifth aspect; or the data transmission method in any one of the sixth aspect or possible implementations of the sixth aspect; or the data transmission method in any one of the seventh aspect or possible implementations of the seventh aspect; or the data transmission method in any one of the eighth aspect or possible implementations of the eighth aspect; or the data transmission method in any one of the ninth aspect or possible implementations of the ninth aspect; or the data transmission method in any one of the tenth aspect or possible implementations of the tenth aspect.

According to a thirteenth aspect, a device-to-device data transmission system is provided, where the data transmission system includes a communications device, and the communications device includes the data transmission apparatus of the eleventh aspect or the twelfth aspect.

Technical effects obtained in the eleventh aspect to the thirteenth aspect are similar to technical effects obtained by using corresponding technical means in the first aspect to the tenth aspect, and details are not described herein again.

The present invention provides a device-to-device data transmission method, apparatus, and system. Before the to-be-transmitted data is transmitted, signal detection is performed only on the first resource subset of the entire resource set, and the available resource in the resource set can be determined based on the signal detection result; and during data transmission, the to-be-transmitted data can be transmitted by directly selecting the resource from the available resource. In other words, in embodiments of the present invention, the communications device does not perform detection on the entire resource set that is used for transmission, so that the communications device does not need to consume a relatively large amount of energy during detection. Therefore, when the communications device is a handheld device, relatively long-time normal use of the handheld device can be ensured.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present invention clearer, the following further describes embodiments of the present invention in detail with reference to the accompanying drawings.

With continuous development of a Long Term Evolution (LTE) communications technology, load of a cellular network is increasingly heavy, and existing spectrum resources become increasingly insufficient. Currently, most mobile devices use various wireless communications technologies such as Bluetooth or Wireless Fidelity (WiFi). Therefore, to implement direct communication between mobile devices, a device-to-device (D2D) technology emerges in the communications standard LTE-A Rel-12 and the communications standard LTE-A Rel-13. Emergency of the D2D technology resolves, to a great extent, problems in the current system that spectrum resources are insufficient and a network is overloaded. In the D2D technology, a handheld device and UE (user equipment) may directly communicate with each other without the need of forwarding by a base station, so that data load of the base station is significantly reduced. In other words, the D2D technology can not only make good use of the spectrum resources, but also improve a spectrum utilization and a data transmission rate, and can further reduce load of the base station.

In the D2D technology, a resource for data transmission of a communications device may be obtained through allocation in the following two modes. In a first mode, the resource for data transmission is allocated by using a centralized control method. To be specific, a base station or a relay node performs resource scheduling, and allocates a resource for data transmission to each communications device, and the communications device may directly transmit data and control information on the resource obtained through allocation. This mode is mainly applied to a scenario in which network coverage is available. In a second mode, a communications device that needs to send data obtains a resource in a contention manner. To be specific, in a scenario in which network coverage is available, a resource for data transmission is an entire resource obtained through scheduling by a base station or a relay node, and all communications devices contend for a small part of resource in this entire resource. In a scenario in which network coverage is unavailable, the communications devices can obtain a preset resource, and all the communications devices contend for a resource for data transmission in the preset resource.

Figure 1:
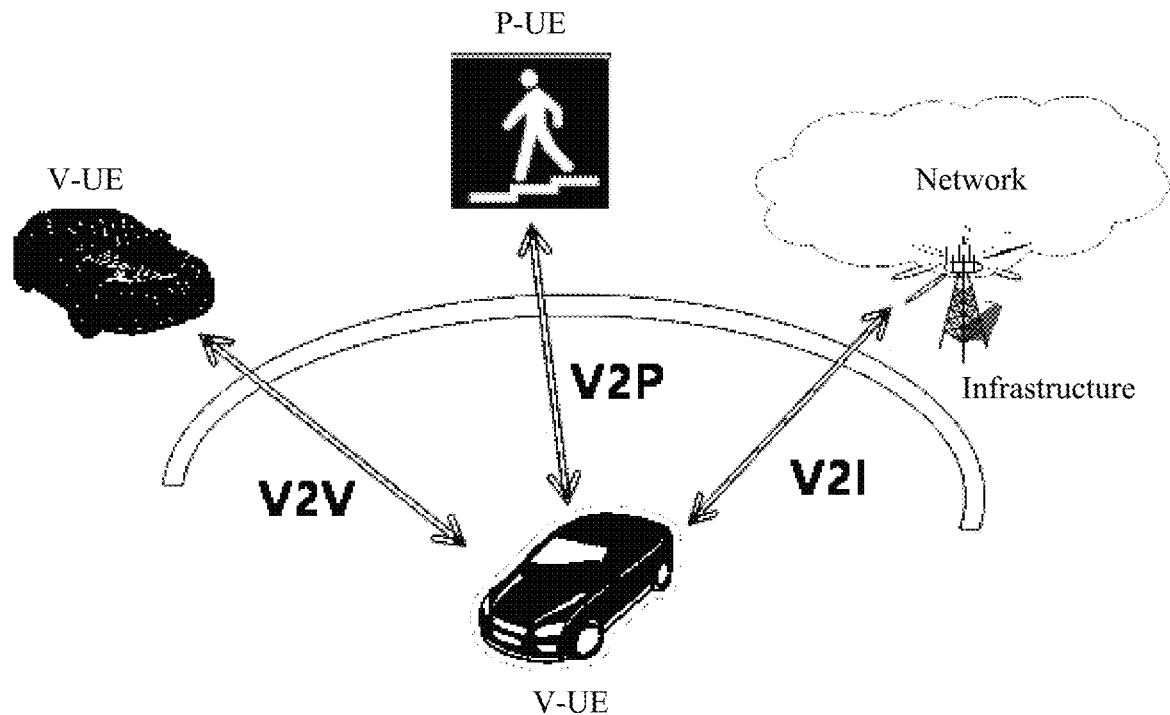
FIG. 1 is a schematic diagram of an application scenario of a device-to-device data transmission method according to an embodiment of the present invention.

A V2X technology is an evolution of the D2D technology. FIG. 1 is a schematic diagram of an application scenario of a device-to-device data transmission method according to an embodiment of the present invention. As shown in FIG. 1, the V2X technology in the communications standard LTE-A Rel-14 is a generic term of a V2V technology, a V2P technology, and a vehicle-to-infrastructure communications (V21 for short) technology. V-UE, P-UE, and infrastructure in FIG. 1 are each a communications device. The V2V technology can implement communication between V-UE (also referred to as an in-vehicle device) and V-UE, the V2P technology can implement communication between V-UE and P-UE (also referred to as a handheld device), and the V21 technology can implement communication between V-UE and infrastructure. However, because energy on the P-UE mainly comes from a battery mounted on the P-UE. In other words, the P-UE can provide a relatively small amount of energy. Therefore, for the P-UE, how to reduce power consumption becomes a problem to be resolved urgently. To be specific, in the V2V technology, when a first device needs to communicate with a second device, the first device needs to first perform, in a preset time period, signal detection on an entire resource set that is used for data transmission, and determines an available transmission resource in the resource set based on a signal detection result. Then, the first device can transmit data to the second device on the determined available transmission resource. However, in the V2P technology, the handheld device needs to consume a relatively large amount of energy if the handheld device also performs signal detection on a resource set before sending data, and consequently, relatively long-time normal use of the handheld device cannot be ensured.

Figure 2:
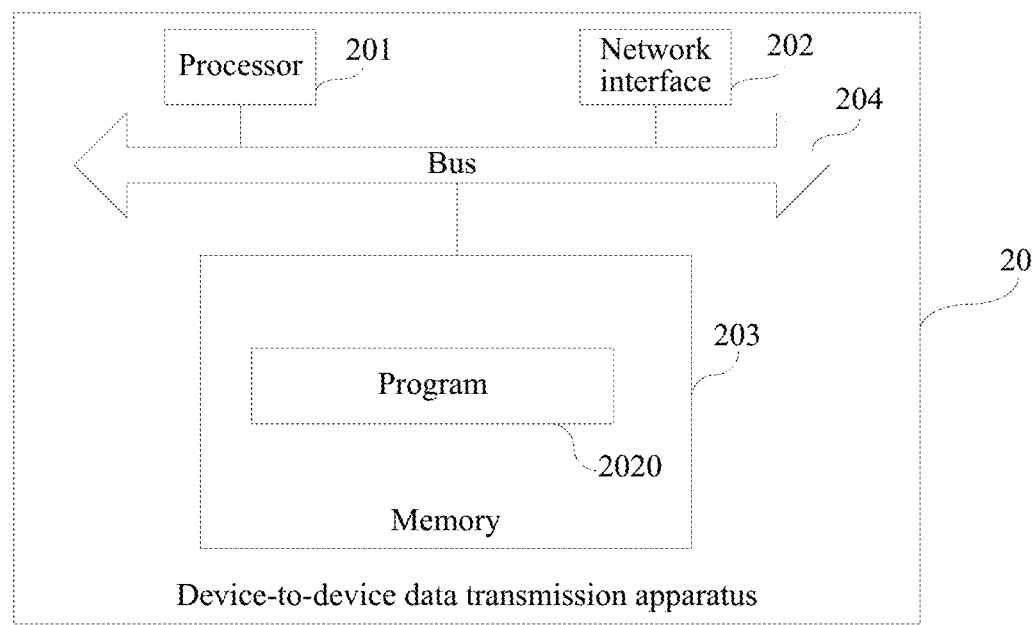
FIG. 2 is a schematic structural diagram of a device-to-device data transmission apparatus according to an embodiment of the present invention.

As shown in FIG. 2, an embodiment of the present invention provides a device-to-device data transmission apparatus 20. The data transmission apparatus 20 may be used for any communications device in the V2X technology shown in FIG. 1. The data transmission apparatus 20 may include at least one processor 201 (such as a central processing unit), at least one network interface 202, a memory 203, and at least one bus 204 for implementing connection and communication between these apparatuses. The memory 203 and the network interface 202 may be separately connected to the processor 201 by using the bus 204. The processor 201 is configured to execute an executable module, such as a computer program, stored in the memory 203. The memory 203 may include a high-speed random access memory (RAM), and may further include a non-volatile memory, for example, at least one magnetic disk memory. Communication connection between the data transmission apparatus and at least one another network element may be implemented by using the at least one network interface 202 (which may be wired or wireless), and the Internet, a wide area network, a local area network, a metropolitan area network, or the like may be used. In some implementations, the memory 203 stores a program 2020, and the program 2020 may be executed by the processor 201.

Figure 3:
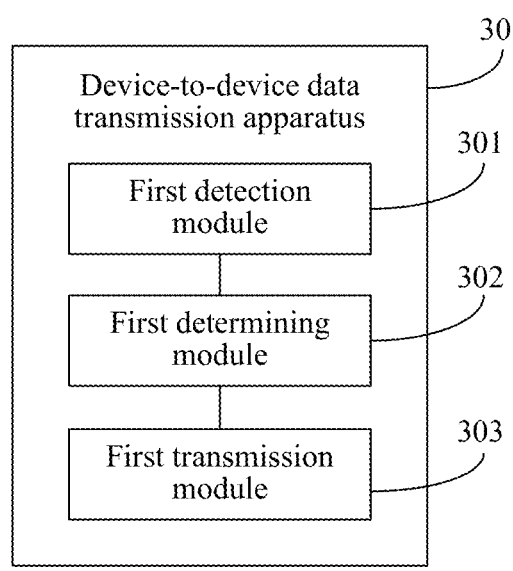
FIG. 3 is a schematic structural diagram of another device-to-device data transmission apparatus according to an embodiment of the present invention.

As shown in FIG. 3, an embodiment of the present invention provides another device-to-device data transmission apparatus 30. The data transmission apparatus may be used for any communications device in the V2X technology shown in FIG. 1, and the data transmission apparatus 30 may include:

a first detection module 301, configured to perform signal detection on a first resource subset of a resource set used for data transmission, where a resource on which the signal detection is performed is less than the resource set;

a first determining module 302, configured to determine an available resource in the resource set based on a signal detection result; and a first transmission module 303, configured to transmit to-be-transmitted data by selecting a resource from the available resource.

This embodiment of the present invention provides the device-to-device data transmission apparatus. Before the to-be-transmitted data is transmitted, the first detection module performs signal detection only on the first resource subset of the entire resource set, and the first determining module can determine the available resource in the resource set based on the signal detection result; and during data transmission, the first transmission module can transmit the to-be-transmitted data by directly selecting the resource from the available resource. In other words, in this embodiment of the present invention, the communications device does not perform detection on the entire resource set that is used for transmission, so that the communications device does not need to consume a relatively large amount of energy during detection. Therefore, when the communications device is a handheld device, relatively long-time normal use of the handheld device can be ensured.

Optionally, the resource set is divided into N initial sets, each initial set includes at least one first resource subset, and N is an integer greater than or equal to 1. In one aspect, each initial set includes at least two first resource subsets, and time domain intervals between any two adjacent first resource subsets of the at least two first resource subsets are equal. In another aspect, each initial set includes at least two first resource subsets, and all time domain intervals between two adjacent first resource subsets in each initial set are an arithmetic sequence.

Optionally, the resource set includes at least two first resource subsets, and all time domain intervals between two adjacent first resource subsets are an arithmetic sequence.

Optionally, the first determining module 302 may be further configured to: determine at least one second resource subset of the resource set as a candidate resource; and determine an available resource in the candidate resource as the available resource in the resource set based on the signal detection result, where a time domain interval between each second resource subset and the first resource subset is a positive integer multiple of a target period, and the target period is determined based on a signal energy value of the first resource subset or a priority of the to-be-transmitted data; or a time domain interval between each second resource subset and the first resource subset is a positive integer multiple of a preset period.

For example, a larger signal energy value indicates a larger target period, and a smaller signal energy value indicates a smaller target period; or a higher priority of the to-be-transmitted data indicates a smaller target period, and a lower priority of the to-be-transmitted data indicates a larger target period; or a larger signal energy value indicates a smaller time domain length of the second resource subset, and a smaller signal energy value indicates a larger time domain length of the second resource subset; or a higher priority of the to-be-transmitted data indicates a larger time domain length of the second resource subset, and a lower priority of the to-be-transmitted data indicates a smaller time domain length of the second resource subset.

Optionally, the first determining module 302 may be further configured to: determine a first parameter K based on a signal energy value or a priority of the to-be-transmitted data, where the first parameter K is an integer greater than or equal to zero; determine a third resource subset on at least one side of the first resource subset as a candidate resource, where the third resource subset includes K consecutive subframes or K consecutive symbols, and is adjacent to the first resource subset; and determine an available resource in the candidate resource as the available resource in the resource set based on the signal detection result.

For example, a larger signal energy value indicates a smaller first parameter K; or a smaller signal energy value indicates a larger first parameter K; or a higher priority of the to-be-transmitted data indicates a smaller first parameter K; or a lower priority of the to-be-transmitted data indicates a larger first parameter K.

Optionally, the first determining module 302 may be further configured to: obtain a preset first parameter K, where the first parameter K is an integer greater than or equal to zero; determine a third resource subset on at least one side of the first resource subset as a candidate resource, where the third resource subset includes K consecutive subframes or K consecutive symbols, and is adjacent to the first resource subset; and determine an available resource in the candidate resource as the available resource in the resource set based on the signal detection result.

Optionally, the signal detection result is a signal energy value of the first resource subset, a one-to-one correspondence between at least one set in the resource set and at least one probability value is configured on the communications device, and the first determining module 302 is further configured to: when the signal energy value is less than a preset threshold, determine the first resource subset as the available resource in the resource set based on the signal detection result; or when the signal energy value is not less than the preset threshold, select a probability value from the at least one probability value as an available probability value, and use a resource in a set corresponding to the available probability value as a candidate resource; and determine an available resource in the candidate resource as the available resource in the resource set based on the signal detection result.

Optionally, the signal detection result is a signal energy value of the first resource subset, and the first detection module 301 is further configured to: obtain a first scheduling assignment (SA) information, where the first SA information indicates a first resource that is used for data transmission, and the first resource belongs to the first resource subset; and determine whether the first SA information indicates existence of a reserved resource; and the first determining module 302 is further configured to: determine the first resource as a candidate resource when the first SA information indicates that no reserved resource exists; and determine an available resource in the candidate resource as the available resource in the resource set based on the signal detection result.

Optionally, the first determining module 302 is further configured to: when the signal energy value is not less than a preset threshold, and the first SA information indicates that no reserved resource exists, determine an available resource in the first resource subset and the first resource as candidate resources, and determine an available resource in the candidate resources as the available resource in the resource set based on the signal detection result.

Optionally, the first detection module 301 is further configured to: perform signal detection on a $U^{th}$ first resource subset, where U is an integer greater than or equal to 1; obtain second SA information transmitted on the $U^{th}$ first resource subset; determine whether the second SA information indicates existence of a reserved resource; when the second SA information indicates existence of a reserved resource, determine a first resource subset to which the reserved resource belongs; and during signal detection on the first resource subset to which the reserved resource belongs, perform signal detection on a resource, other than the reserved resource, in the first resource subset to which the reserved resource belongs.

Figure 4:
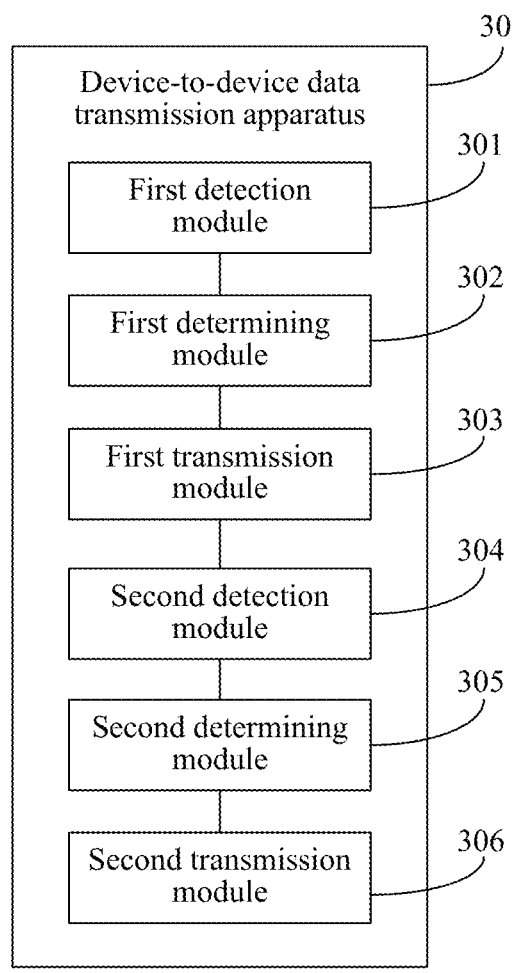
FIG. 4 is a schematic structural diagram of still another device-to-device data transmission apparatus according to an embodiment of the present invention.

Optionally, the first transmission module 303 is further configured to transmit first to-be-transmitted data by selecting an available resource from a first available resource. FIG. 4 is a schematic structural diagram of still another device-to-device data transmission apparatus 30 according to an embodiment of the present invention. As shown in FIG. 4, on a basis of FIG. 3, the data transmission apparatus 30 may further include:

a second detection module 304, configured to: during transmission of an $(X+1)^{th}$ piece of to-be-transmitted data, perform $(X+1)^{th}$ signal detection on the first resource subset in the resource set, where X is an integer greater than or equal to 1;

a second determining module 305, configured to determine a second available resource in the resource set based on a signal detection result of the $(X+1)^t$ signal detection and at least one of signal detection results of first X signal detections that are performed during transmission of first X pieces of to-be-transmitted data; and a second transmission module 306, configured to transmit the $(X+1)^{th}$ piece of to-be-transmitted data by selecting a resource from the second available resource.

This embodiment of the present invention provides the device-to-device data transmission apparatus. Before the to-be-transmitted data is transmitted, the first detection module performs signal detection only on the first resource subset of the entire resource set, and the first determining module can determine the available resource in the resource set based on the signal detection result; and during data transmission, the first transmission module can transmit the to-be-transmitted data by directly selecting the resource from the available resource. In other words, in this embodiment of the present invention, the communications device does not perform detection on the entire resource set that is used for transmission, so that the communications device does not need to consume a relatively large amount of energy during detection. Therefore, when the communications device is a handheld device, relatively long-time normal use of the handheld device can be ensured.

Figure 5:
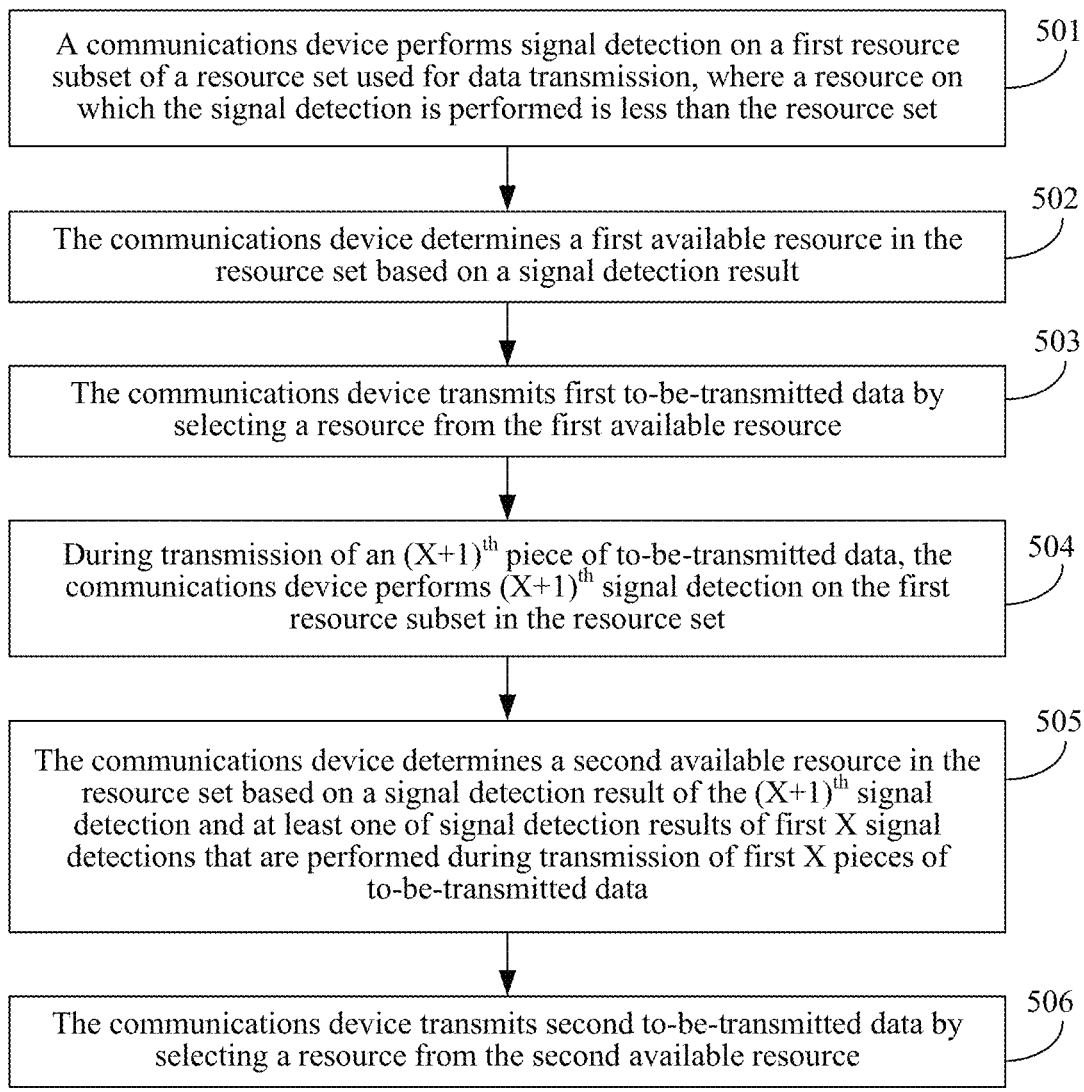
FIG. 5 is a flowchart of a device-to-device data transmission method according to an embodiment of the present invention.

As shown in FIG. 5, an embodiment of the present invention provides a device-to-device data transmission method. The data transmission method may be used for a communications device. For example, the communications device may be any communications device in FIG. 1. The data transmission method may be implemented by executing the program 2020 by the processor 201 in FIG. 2. The data transmission method may include the following steps.

Step 501: The communications device performs signal detection on a first resource subset of a resource set used for data transmission, where a resource on which the signal detection is performed is less than the resource set.

For example, step 501 may be implemented by the first detection module 301 in the data transmission apparatus shown in FIG. 3 or FIG. 4.

Figure 6:
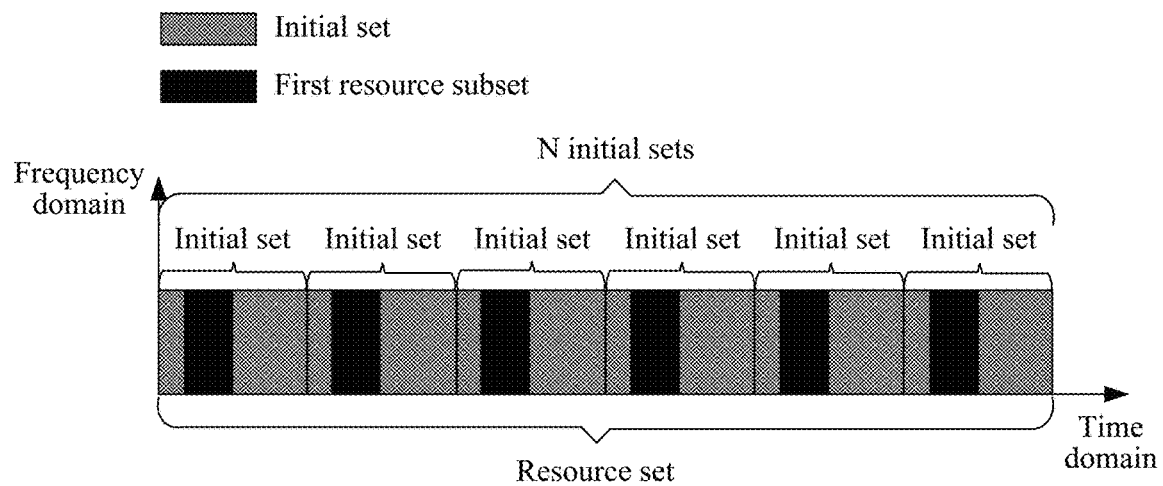
FIG. 6 is a schematic diagram of distribution of first resource subsets in a resource set according to an embodiment of the present invention.

In a first aspect, FIG. 6 is a schematic diagram of distribution of first resource subsets in a resource set according to an embodiment of the present invention. As shown in FIG. 6, the resource set may be divided into N initial sets, and each initial set includes at least one first resource subset (in FIG. 6, an example in which each initial set includes one first resource subset is used, in an actual application, each initial set may alternatively include a plurality of first resource subsets, and this embodiment of the present invention imposes no limitation thereto). N may be an integer greater than or equal to 1. In step 501, signal detection may be performed on each first resource subset.

Figure 7:
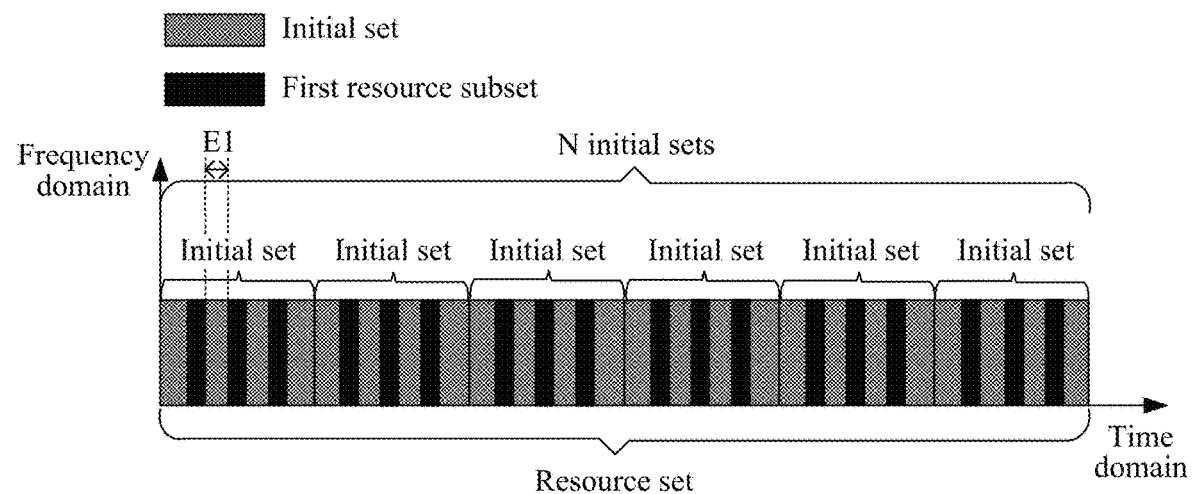
FIG. 7 is another schematic diagram of distribution of first resource subsets in a resource set according to an embodiment of the present invention.

In a second aspect, FIG. 7 is another schematic diagram of distribution of first resource subsets in a resource set according to an embodiment of the present invention. As shown in FIG. 7, the resource set may be divided into N initial sets, each initial set includes at least two first resource subsets, and time domain intervals E1 between any two adjacent first resource subsets of the at least two first resource subsets are equal.

Figure 8:
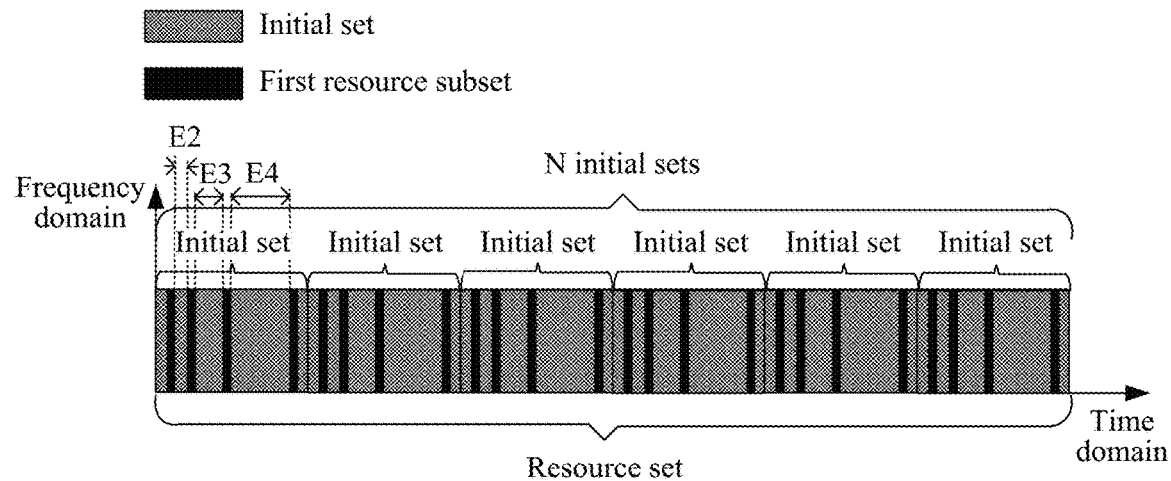
FIG. 8 is still another schematic diagram of distribution of first resource subsets in a resource set according to an embodiment of the present invention.

In a third aspect, FIG. 8 is still another schematic diagram of distribution of first resource subsets in a resource set according to an embodiment of the present invention. As shown in FIG. 8, the resource set may be divided into N initial sets, each initial set includes at least two first resource subsets, and all time domain intervals between two adjacent first resource subsets in each initial set are an arithmetic sequence. For example, a time domain interval between a first first resource subset and a second first resource subset is E2, a time domain interval between the second first resource subset and a third first resource subset is E3, a time domain interval between the third first resource subset and a fourth first resource subset is E4, and E2, E3, and E4 may be successively arranged into an arithmetic sequence. For example, E2 is 2 milliseconds, E3 is 4 milliseconds, E4 is 6 milliseconds, and 2, 4, and 6 can constitute an arithmetic sequence. In an actual application, all the time domain intervals between two adjacent first resource subsets may not be an arithmetic sequence, and meet another number arrangement rule, and this embodiment of the present invention imposes no limitation thereto. In step 501, signal detection may be performed on each first resource subset.

Figure 9:
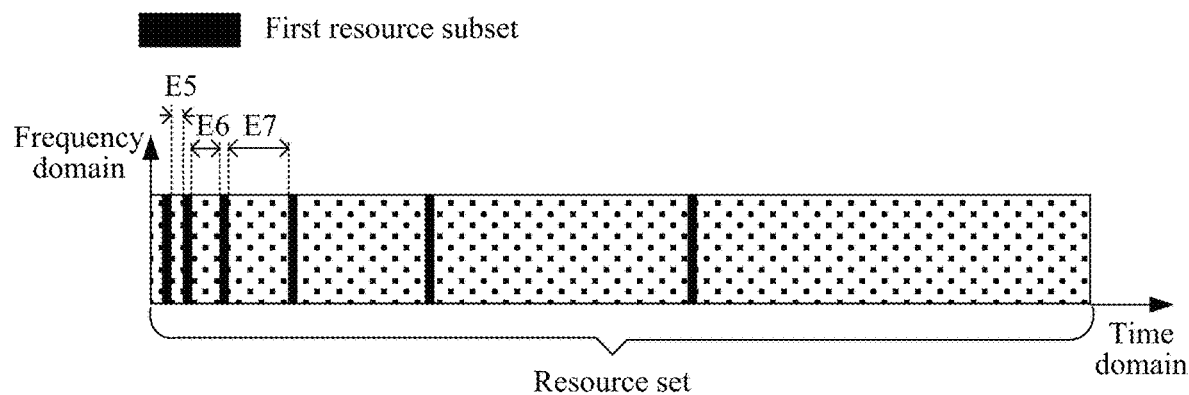
FIG. 9 is yet another schematic diagram of distribution of first resource subsets in a resource set according to an embodiment of the present invention.

In a fourth aspect, FIG. 9 is yet another schematic diagram of distribution of first resource subsets in a resource set according to an embodiment of the present invention. As shown in FIG. 9, the resource set is not divided into N initial sets, the resource set directly includes at least two first resource subsets, and all time domain intervals between two adjacent first resource subsets in the at least two first resources subsets are an arithmetic sequence. For example, a time domain interval between a first first resource subset and a second first resource subset is E5, a time domain interval between the second first resource subset and a third first resource subset is E6, a time domain interval between the third first resource subset and a fourth first resource subset is E7, and E5, E6, and E7 may be successively arranged into an arithmetic sequence. For example, E5 is 4 milliseconds, E6 is 8 milliseconds, E7 is 12 milliseconds, and 4, 8, 12 can constitute an arithmetic sequence. In step 501, signal detection may be performed on each first resource subset.

In the foregoing four aspects, because a sum of all the first resource subsets is less than the resource set, compared with detection on an entire resource set in a related technology, a detection range is significantly reduced, a detection speed is enhanced, and energy consumption required by detection is reduced. For example, when the resource set is divided into N initial sets, and N is an integer greater than or equal to 2, time domain sizes of any two initial sets may be the same or different, and this embodiment of the present invention imposes no limitation thereto.

Specifically, a signal detection result of the signal detection in step 501 may be a signal energy value of the first resource subset. For example, the signal energy value may include reference signal received power (RSRP) or reference signal received quality (RSRQ). The first resource subset may include a first resource, and the first resource subset may further include another resource different from the first resource. When the communications device performs the signal detection on the first resource subset in step 501, the communications device can not only perform signal detection on all resources in the first resource subset, but also obtain first SA information, where the first SA information indicates the first resource that is used for data transmission, and determine whether the first SA information indicates existence of a reserved resource.

Figure 10:
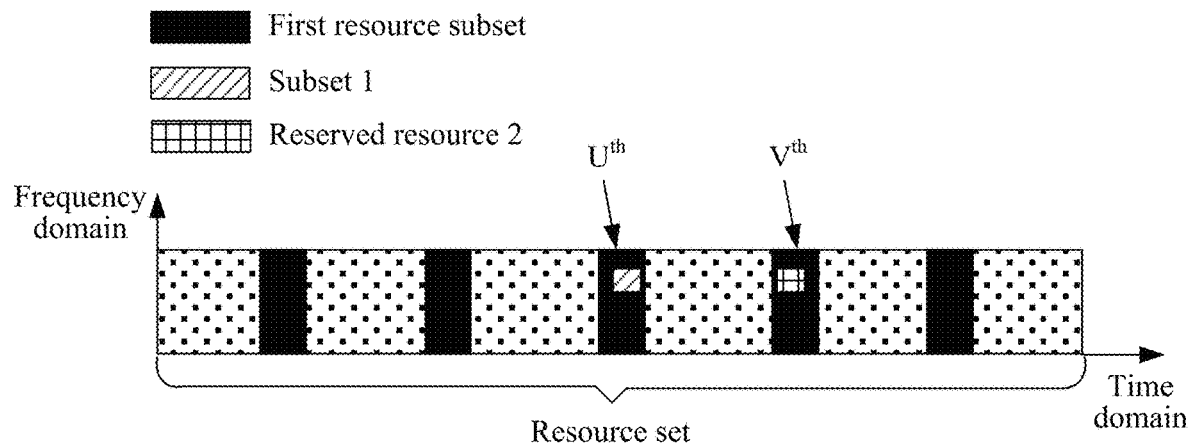
FIG. 10 is a schematic diagram of distribution of first resource subsets in a resource set according to another embodiment of the present invention.

For example, during the signal detection on the first resource subset in step 501, signal detection may be performed on a $U^{th}$ first resource subset, second SA information transmitted on the $U^{th}$ first resource subset may be obtained, and whether the second SA information indicates existence of a reserved resource may be determined. Optionally, U is an integer greater than or equal to 1. When the second SA information indicates existence of a reserved resource, a first resource subset to which the reserved resource belongs is determined; and during signal detection on the first resource subset to which the reserved resource belongs, signal detection is performed on a resource, other than the reserved resource, in the first resource subset to which the reserved resource belongs. U is an integer greater than or equal to 1. As shown in FIG. 10, the resource set may include a plurality of first resource subsets, the second SA information is transmitted on a specific first resource subset, the second SA information indicates that data information related to the second SA information is transmitted on a subset 1 in the $U^{th}$ first resource subset, the second SA information is further used to indicate that there is a reserved resource 2 in the resource set, and the reserved resource 2 is in a $V^{th}$ first resource subset. Therefore, during signal detection on the first resource subsets, signal detection may be first performed on all resources in the $U^{th}$ first resource subset, and then signal detection may be performed on another resource, other than the reserved resource 2, in the $V^{th}$ first resource subset.

In other words, when it is determined that a to-be-detected first resource subset includes a reserved resource, it may be considered by default that, the reserved resource is an unavailable resource if a signal energy value of the reserved resource is relatively great when signal detection is performed on the first resource subset. A quantity of resources that are included in signal detection is further reduced, and energy that needs to be consumed by the communications device during data transmission is reduced.

Step 502: The communications device determines a first available resource in the resource set based on a signal detection result.

For example, step 502 may be implemented by the first determining module 302 in the data transmission apparatus 30 shown in FIG. 3 or FIG. 4.

Optionally, after the signal detection on the first resource subset is completed, and when in step 502, the communications device determines the first available resource in the resource set based on the signal detection result, the first available resource may be determined in the following four manners.

In a first manner, the communications device may first determine a target period based on a signal energy value of the first resource subset or a priority of the to-be-transmitted data. For example, in a case of a larger signal energy value of the first resource subset, a larger target period is determined, and in a case of a smaller signal energy value of the first resource subset, a smaller target period is determined; or in a case of a higher priority of the to-be-transmitted data, a smaller target period is determined, and in a case of a lower priority of the to-be-transmitted data, a larger target period is determined. Further, during determining of the target period, a time domain length of a second resource subset may be further determined based on the signal energy value of the first resource subset or the priority of the to-be-transmitted data. For example, in a case of a larger signal energy value of the first resource subset, a smaller time domain length of the second resource subset is determined, and in a case of a smaller signal energy value of the first resource subset, a larger time domain length of the second resource subset is determined; or in a case of a higher priority of the to-be-transmitted data, a larger time domain length of the second resource subset is determined, and in a case of a lower priority of the to-be-transmitted data, a smaller time domain length of the second resource subset is determined. Then, the communications device may use, as the second resource subset, a resource subset with a time domain interval between the resource subset and the first resource subset being a positive integer multiple of the target period, determine at least one second resource subset of the resource set as a candidate resource, and determine an available resource in the candidate resource as the first available resource in the resource set based on the signal detection result of the first resource subset. It should be noted that, when a signal energy value of a specific resource is greater than a threshold, the resource may be considered as an available resource; and when a signal energy value of a specific resource is less than or equal to the threshold, the resource may be considered as an unavailable resource.

Specifically, a larger signal energy value of the first resource subset indicates more resources occupied in the first resource subset, a larger possibility of occupying a resource close to the first resource subset, and a smaller possibility of occupying a resource far away from the first resource subset. Therefore, during determining of the target period based on the signal energy value of the first resource subset, in a case of a larger signal energy value of the first resource subset, a larger target period may be determined and the length of the second resource subset is smaller, so that it is ensured that there are a relatively large quantity of first available resources in the determined candidate resource.

Figure 11:
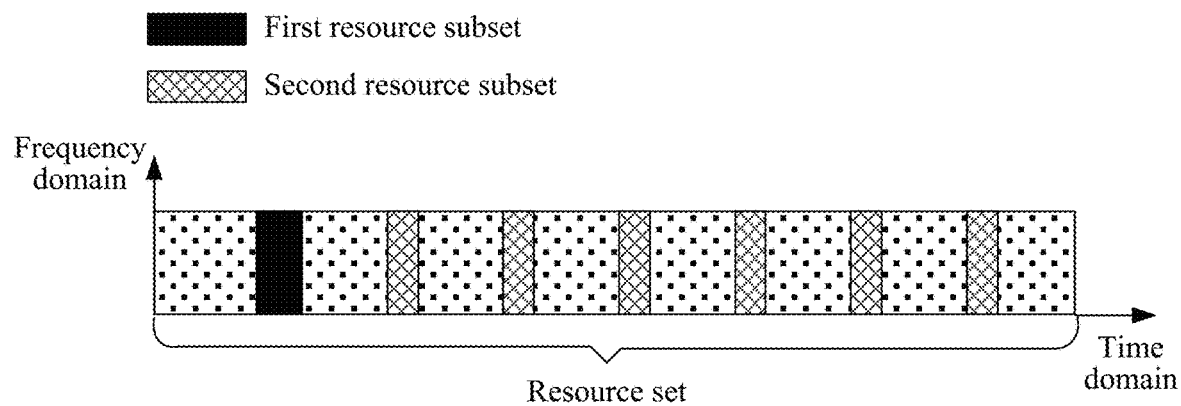
FIG. 11 is a schematic diagram of distribution of first available resources according to an embodiment of the present invention.

Optionally, in the first manner, each resource subset with a time domain interval between the resource subset and the first resource subset being a positive integer multiple of a preset period may alternatively be determined as the second resource subset. The preset period may be pre-configured by a base station for the communications device. The time domain length of each second resource subset may be a preset length. The time domain length of each second resource subset may alternatively be determined in the first manner. For example, FIG. 11 is a schematic diagram of distribution of first available resources according to an embodiment of the present invention. As shown in FIG. 11, a time domain interval F1 between each second resource subset and the first resource subset may be a positive integer multiple of the target period or the preset period.

Figure 12:
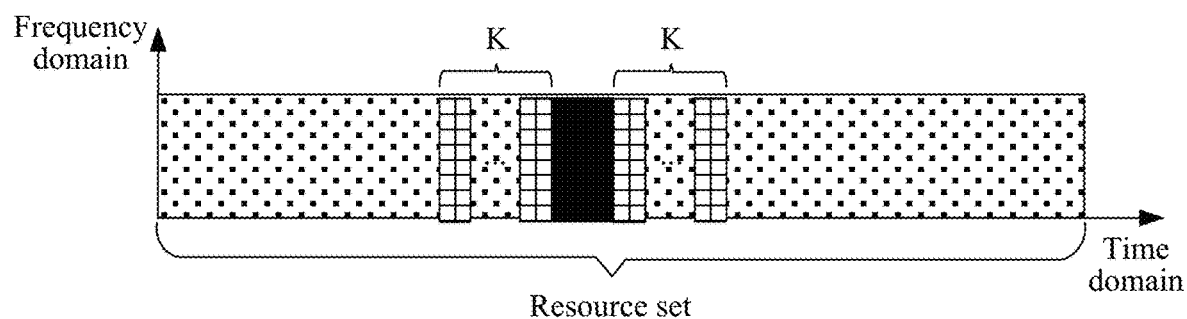
FIG. 12 is another schematic diagram of distribution of first available resources according to an embodiment of the present invention.

In a second manner, the communications device may first determine a first parameter K based on a signal energy value of the first resource subset or a priority of the to-be-transmitted data, and the determined first parameter K may be an integer greater than or equal to zero. For example, in a case of a larger signal energy value of the first resource subset, a smaller first parameter K is determined, and a smaller signal energy value indicates a larger first parameter K; or a higher priority of the to-be-transmitted data indicates a smaller first parameter K, and a lower priority of the to-be-transmitted data indicates a larger first parameter K. As shown in FIG. 12, after the first parameter K is determined, a third resource subset on at least one side of the first resource subset may be determined as a candidate resource. It should be noted that, each third resource subset may include K consecutive subframes or K consecutive symbols, and each third resource subset is adjacent to the first resource subset. For example, in FIG. 12, an example in which the candidate resource includes third resource subsets (a total of two third resource subsets) located on both sides of the first resource subset. In an actual application, the candidate resource may alternatively include only a third resource subset located on a left side of the first resource subset, or the candidate resource may alternatively include only a third resource subset located on a right side of the first resource subset, and this embodiment of the present invention imposes no limitation thereto. Further, after the candidate resource is determined, an available resource in the candidate resource may be determined as the first available resource in the resource set based on the signal detection result of the first resource subset.

Specifically, a larger signal energy value of the first resource subset indicates more resources occupied in the first resource subset, a larger possibility of occupying a resource close to the first resource subset, and a smaller possibility of occupying a resource far away from the first resource subset. Therefore, during determining of the first parameter K based on the signal energy value of the first resource subset, in a case of a larger signal energy value of the first resource subset, a smaller first parameter K may be determined, and in a case of a smaller signal energy value of the first resource subset, a larger first parameter K is determined, so that it is ensured that there are a relatively large quantity of first available resources in the determined candidate resource.

Optionally, the first parameter K may alternatively be not determined in the second manner, and may be directly configured by a base station or another higher layer for the communications device, and this embodiment of the present invention imposes no limitation thereto.

In a third manner, the signal detection result in step 501 is a signal energy value of the first resource subset, and a one-to-one correspondence between at least one set in the resource set and at least one probability value is configured on the communications device. For example, a list shown in Table 1 may be configured on the communications device, and the list may be used to indicate a one-to-one correspondence between five resource subsets and five probability values. A probability value corresponding to a resource subset 1 is 5%, a probability value corresponding to a resource subset 2 is 10%, a probability value corresponding to a resource subset 3 is 40%, a probability value corresponding to a resource subset 4 is 20%, and a probability value corresponding to a resource subset 5 is 25%.

TABLE 1

| Resource subset | Probability value |
|---|---|
| 1 | 5% |
| 2 | 10% |
| 3 | 40% |
| 4 | 20% |
| 5 | 25% |

Figure 13:
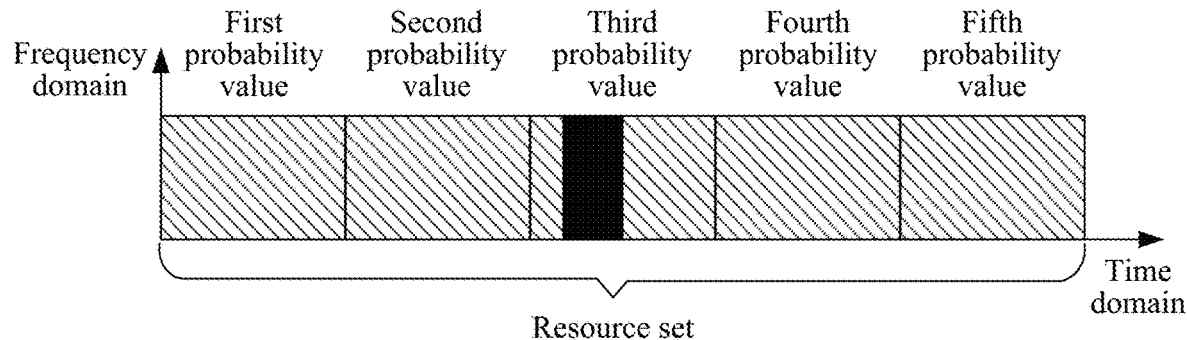
FIG. 13 is a schematic diagram of a correspondence between a resource set and a probability value according to an embodiment of the present invention.

When step 502 is being performed, whether the signal energy value of the first resource subset is less than a preset threshold may be first determined, and when the signal energy value of the first resource subset is less than the preset threshold, the first resource subset may be determined as the first available resource in the resource set based on the signal detection result of the first resource subset. When the signal energy value of the first resource subset is not less than the preset threshold, a probability value may be selected from the at least one probability value as an available probability value in a random manner or by using a preset rule, a resource subset corresponding to the available probability value is used as a candidate resource, and an available resource in the candidate resource is determined as the first available resource in the resource set based on the signal detection result. As shown in FIG. 13, it is assumed that the resource set includes a total of five sets, and that each set is corresponding to a probability value. The five sets are corresponding to a total of five probability values (including a first probability value, a second probability value, a third probability value, a fourth probability value, and a fifth probability value). A third set of the five sets includes a first resource subset. When it is determined that the signal energy value of the first resource subset is not less than the preset threshold, a probability value may be selected from the five probability values as an available probability value in a random manner or by using a preset rule, a resource in a set corresponding to the available probability value is used as a candidate resource, and an available resource in the candidate resource is determined as the first available resource in the resource set based on the signal detection result.

Figure 14:
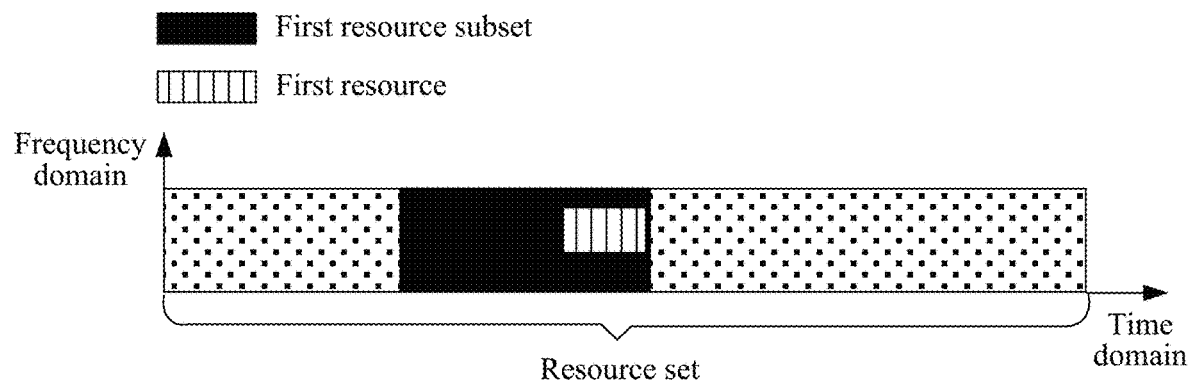
FIG. 14 is another schematic diagram of distribution of first resource subsets in a resource set according to another embodiment of the present invention.

In a fourth manner, if whether the first SA information indicates existence of a reserved resource is determined in step 501, in step 502, when the first SA information indicates that no reserved resource exists, the communications device may directly determine the first resource as a candidate resource with no need to determine a magnitude relationship between the signal energy value of the first resource subset and the preset threshold, and determine an available resource in the candidate resource as the first available resource in the resource set based on the signal detection result. Alternatively, when the signal energy value of the first resource subset is not less than (greater than or equal to) the preset threshold, and the first SA information indicates that no reserved resource exists, the communications device may determine a first available resource in the first resource subset and the first resource as candidate resources, and determine an available resource in the candidate resources as the first available resource in the resource set based on the signal detection result. As shown in FIG. 14, a resource set includes a first resource subset, the first resource subset is less than the resource set, and the first resource subset includes a first resource. The first SA information indicates that there is no reserved resource in data that is transmitted on the first resource. Therefore, in step 502, the first resource may be directly determined as a candidate resource. Alternatively, in step 502, if the signal energy value of the first resource subset is greater than or equal to the preset threshold, the first available resource in the first resource subset and the first resource may be directly determined as candidate resources.

It should be noted that, if the signal energy value, detected in step 501, of the first resource subset is less than the preset threshold, in the foregoing four manners, the first resource subset may be further determined as a candidate resource. In other words, the candidate resource determined in step 502 may include the first resource subset and the candidate resource determined in any one of the foregoing four manners.

Step 503: The communications device transmits first to-be-transmitted data by selecting a resource from the first available resource.

For example, step 503 may be implemented by the first transmission module 303 in the data transmission apparatus 30 shown in FIG. 3 or FIG. 4. Specifically, after the first available resource in the resource set is determined, in step 503, the communications device may transmit the first to-be-transmitted data by directly selecting the resource from the determined first available resource in the resource set.

Step 504: During transmission of an $(X+1)^{th}$ piece of to-be-transmitted data, the communications device performs $(X+1)^{th}$ signal detection on the first resource subset in the resource set.

For example, step 504 may be implemented by the second detection module 304 in the data transmission apparatus 30 shown in FIG. 4. X may be an integer greater than or equal to 1.

Step 505: The communications device determines a second available resource in the resource set based on a signal detection result of the $(X+1)^{th}$ signal detection and at least one of signal detection results of first X signal detections that are performed during transmission of first X pieces of to-be-transmitted data.

For example, step 505 may be implemented by the second determining module 305 in the data transmission apparatus 30 shown in FIG. 4. In other words, during determining of the available resource each time, the available resource may be determined with reference to previous detection results, so that the previous detection results may serve as a reference for determining the available resource this time, thereby improving accuracy of the available resource determined this time.

Step 506: The communications device transmits second to-be-transmitted data by selecting a resource from the second available resource.

For example, step 506 may be implemented by the second transmission module 306 in the data transmission apparatus 30 shown in FIG. 4. For example, the second to-be-transmitted data may be the same as the first to-be-transmitted data, or different from the first to-be-transmitted data, and this embodiment of the present invention imposes no limitation thereto. After the second available resource in the resource set is determined, in step 506, the communications device may transmit the second to-be-transmitted data by directly selecting the resource from the determined second available resource in the resource set.

Further, when the resource set includes a plurality of first resource subsets, detection may be further performed successively on the plurality of first resource subsets. Each first resource subset that is not the first one may be detected with reference to results of a plurality of previous detections.

This embodiment of the present invention provides the device-to-device data transmission method. Before the to-be-transmitted data is transmitted, signal detection is performed only on the first resource subset of the entire resource set, and the available resource in the resource set can be determined based on the signal detection result; and during data transmission, the to-be-transmitted data can be transmitted by directly selecting the resource from the available resource. In other words, in this embodiment of the present invention, the communications device does not perform detection on the entire resource set that is used for transmission, so that the communications device does not need to consume a relatively large amount of energy during detection. Therefore, when the communications device is a handheld device, relatively long-time normal use of the handheld device can be ensured.

Figure 15:
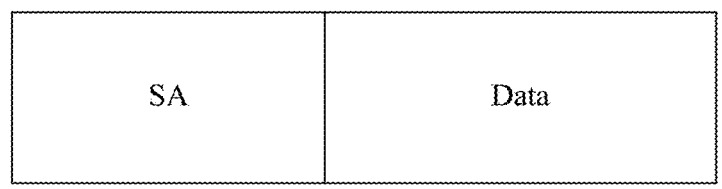
FIG. 15 is a schematic diagram of positions of SA information and data information provided in a related technology.
Figure 16:
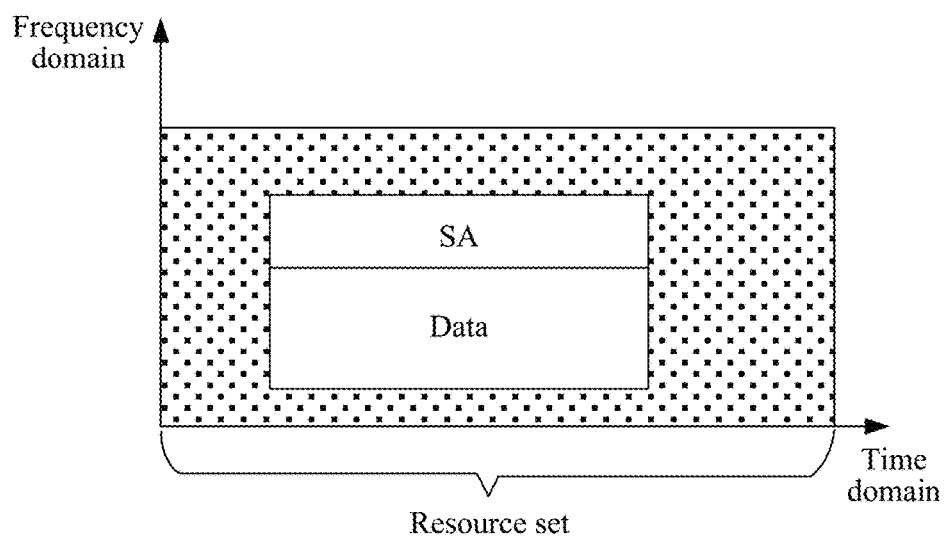
FIG. 16 is another schematic diagram of positions of SA information and data information provided in a related technology.

In a D2D technology of the communications standard LTE-A Rel-12, a resource for transmitting SA information and a resource for transmitting data information are distributed in different subframes in a time-division multiplexing (TDM) manner. As shown in FIG. 15, in time domain, the resource for transmitting SA information is located in front of the resource for transmitting data information. As shown in FIG. 16, in the communications standard LTE-A Rel-14, a resource set that is used for data transmission in a V2V technology includes an SA resource (a resource used for transmitting SA information) and a data resource (a resource used for transmitting data information), but the SA resource and the data resource are located in same time domain in a frequency division multiplexing (FDM) manner, and are located on different spectral bandwidths.

In one aspect, in the V2V technology, when needing to transmit data, the communications device may perform energy detection on each resource in the resource set by sensing the resource set, for example, measure RSRP or RSRQ of each resource. If the communications device detects that a measurement result of a specific resource is greater than or equal to a threshold, it may be considered that the resource has been occupied by another communications device, and if the communications device detects that a measurement result of a specific resource is less than the threshold, it may be considered that the resource is an idle resource. After the idle resource is determined, the data may be transmitted on the idle resource. In another aspect, in the V2V technology, when needing to transmit data, the communications device may receive SA information sent by another communications device, and then decode the received SA information, where the SA information may include information about a resource occupied by data information corresponding to the SA information. The communications device may determine, by decoding the received SA information, the resource occupied by the data information transmitted by the another communications device. If the SA information is successfully decoded, the communications device may consider that the data information corresponding to the SA information occupies a specific resource, and if the SA information is unsuccessfully decoded, the communications device may consider that the data information corresponding to the SA information does not occupy the resource. In this case, the communications device may transmit the data on an unoccupied resource.

Figure 17:
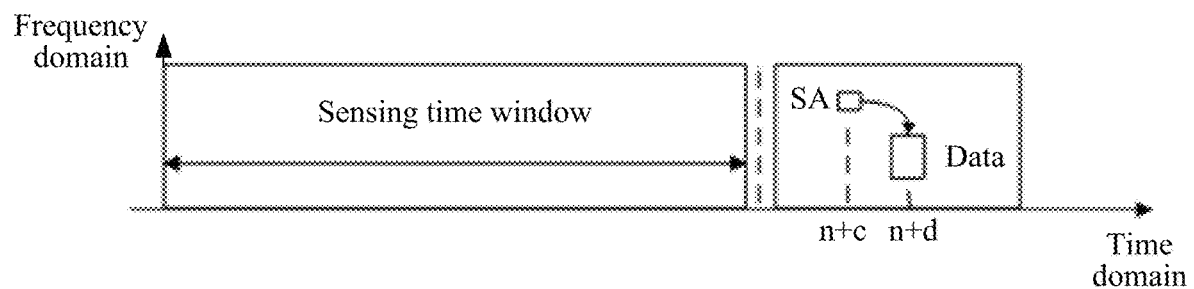
FIG. 17 is a schematic diagram of device-to-device data transmission provided in a related technology.

As shown in FIG. 17, in the foregoing two aspects, detection and sending on the resource set are both implemented in a sensing window, and sensing window sizes for all communications devices (such as UEs) are the same (for example, time windows for all the communications devices are one second). Only after completing detection and sensing on the resource set in the sensing window, the communications device starts to allocate a resource to to-be-transmitted data information and SA information related to the data information. Specifically, in the V2V technology, when allocating a resource to the to-be-transmitted data information, UE may determine, by using an SA information decoding technology in a sensing technology, a detected unoccupied resource and a resource that has been occupied but whose signal energy value is less than a corresponding energy threshold as current candidate resources. The foregoing energy threshold is related to a priority of the to-be-transmitted data information. A higher priority of the data information indicates a larger energy threshold to be used during resource allocation for the data information, and a lower priority of the data information indicates a smaller energy threshold to be used during resource allocation for the data information. Currently, in the V2V technology, there are a total of eight priorities for the data information, and a priority of each piece of data information is indicated by using 3-bit signaling in SA information related to the data information. The UE may decode SA information sent by another UE, to determine a priority of data that is being transmitted by the another UE, and compare the priority of the data that is being transmitted by the another UE with a priority of data that needs to be sent by the UE itself, to determine an energy threshold to be used for detection. Specifically, a preset table may be pre-stored on each UE, and the preset table is used to record eight priorities and energy thresholds corresponding to any two of the eight priorities.

For example, the preset table may be shown as Table 2. The eight priorities may include a priority 1, a priority 2, a priority 3, a priority 4, a priority 5, a priority 6, a priority 7, and a priority 8, and any two same or different priorities in the eight priorities are corresponding to an energy threshold. When UE that currently needs to send data is UE-1, and data being transmitted on a to-be-detected resource is data of UE-2, the UE-1 may determine, based on a priority (such as the priority 2) of the to-be-transmitted data and a priority (such as the priority 3) of the data of the UE-2, that an energy threshold to be used for detection on the to-be-detected resource is an energy threshold 11 corresponding to the priority 2 and the priority 3. It should be noted that, although 64 energy thresholds are recorded in Table 2, values of the 64 energy thresholds have no practical significance, and are merely an example. For example, a value range of the 64 energy thresholds may be from −128 dBm to 0 dBm, and values may be at an interval of 2 dBm.

TABLE 2

| Priority of UE-1 | Priority of UE-2 | | | | | | | |
|---|---|---|---|---|---|---|---|---|
| | Priority 1 | Priority 2 | Priority 3 | Priority 4 | Priority 5 | Priority 6 | Priority 7 | Priority 8 |
| Priority 1 | 1 | 2 | 3 | 4 | 5 | 6 | 7 | 8 |
| Priority 2 | 9 | 10 | 11 | 12 | 13 | 14 | 15 | 16 |
| Priority 3 | 17 | 18 | 19 | 20 | 21 | 22 | 23 | 24 |
| Priority 4 | 25 | 26 | 27 | 28 | 29 | 30 | 31 | 32 |
| Priority 5 | 33 | 34 | 35 | 36 | 37 | 38 | 39 | 40 |
| Priority 6 | 41 | 42 | 43 | 44 | 45 | 46 | 47 | 48 |
| Priority 7 | 49 | 50 | 51 | 52 | 53 | 54 | 55 | 56 |
| Priority 8 | 57 | 58 | 59 | 60 | 61 | 62 | 63 | 64 |

In addition, when decoding the SA information sent by the another UE, the UE can not only determine a resource that needs to be occupied by the data of the another UE, but also determine a resource that is reserved by the another UE for next data transmission. For example, as shown in FIG. 17, UE sends SA information at a moment n+c, where the SA information indicates that the UE is to send data information at a moment n+d, and the SA information further indicates a reserved resource of the UE. In other words, a current frequency domain resource at a moment n+d+P*i is a reserved resource, where P=100 milliseconds, and a value range of i is [0, 1, 2, . . . , 10]. When i=0, it may be determined that the UE does not reserve a resource; when i=1, a reservation period is 100*1 milliseconds; when i=2, a reservation period is 100*2 milliseconds, and so on. A maximum reservation period is 100*10=1000 milliseconds. For example, a value of i may be indicated by using 4-bit signaling in the SA information. When another UE obtains a specific piece of SA information, the another UE may determine, based on the SA information, a resource for transmitting data information related to the SA information, and may further learn a reserved resource of the UE that sends the data information.

After the candidate resource is determined, the UE may determine whether the current candidate resource is less than 20% of the resource set, that is, determine whether the current candidate resource is less than 0.2 times of the resource set. If the current candidate resource is greater than or equal to 20% of the resource set, the UE may select an available resource from the current candidate resource, and select a resource from the available resource and allocate the selected resource to the data information, to transmit the data information. If the current candidate resource is less than 20% of the resource set, a current energy threshold is increased by a step of 3 dB, to re-determine a current candidate resource until the current candidate resource is greater than or equal to 20% of the resource set.

In a related technology, before transmitting data, V-UE needs to determine whether a candidate resource is greater than 20% of a resource set, and a possibility that the candidate resource is greater than 20% of the resource set is relatively small. Therefore, the V-UE needs to repeatedly increase an energy threshold, and re-determine a candidate resource, and therefore a relatively large amount of energy needs to be consumed. If P-UE also uses a similar principle, the P-UE consumes a relatively large amount of energy. Therefore, long-time normal use of the P-UE cannot be ensured.

When the data information is being transmitted on a specific resource, a counter may be used for counting. When the data information starts to be transmitted by occupying a resource, a value of the counter is set to a maximum value, and then decreases sequentially. When the value of the counter decreases to 0, the UE may randomly select a probability value p from [0, 0.2, 0.4, 0.6, 0.8]. For example, if the selected p is 0.6, the UE may continue to use the current resource for sending the data information with a probability of 0.6, and at the same time, the counter is reset to the maximum value. In addition, the UE performs resource reselection by using a probability of 1−p=0.4. During resource reselection, the UE may sort previously determined candidate resources based on signal energy values, and then randomly select a resource from a resource subset with a minimum signal energy value for sending the data information. For example, a size of each resource subset is equal to 20% of the resource set.

Figure 18:
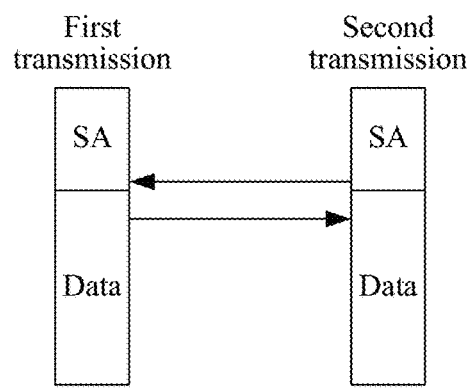
FIG. 18 is a schematic diagram of data repetition provided in a related technology.

Further, in the V2V technology, to ensure information transmission reliability, a specified maximum quantity of transmissions is usually 2. In other words, during transmission of the data information, the data information is transmitted twice, and SA information of first transmission indicates a time interval between the first transmission of data information and next transmission of data information. As shown in FIG. 18, SA information of first transmission may indicate a time interval between the first transmission of data information and second transmission of data information, and SA information of the second transmission may indicate a time interval between the second transmission of data information and the first transmission of data information.

Figure 19:
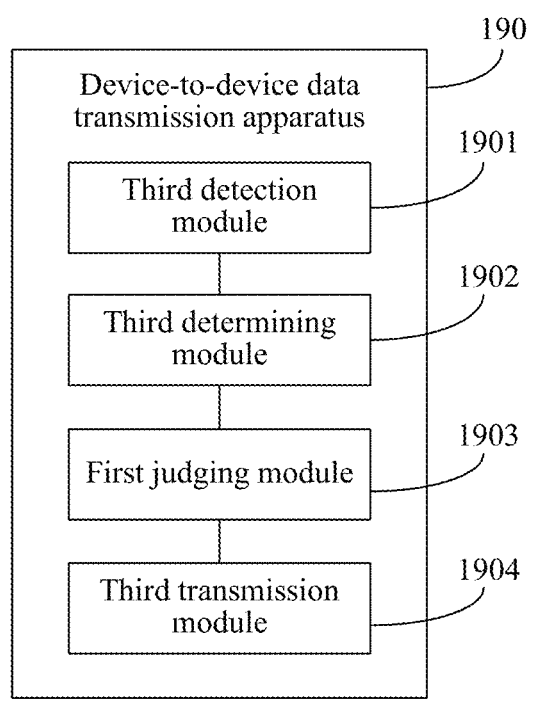
FIG. 19 is a schematic structural diagram of yet another device-to-device data transmission apparatus according to an embodiment of the present invention.

As shown in FIG. 19, an embodiment of the present invention provides yet another device-to-device data transmission apparatus 190. The data transmission apparatus 190 may be used for the communications device P-UE in FIG. 1. The data transmission apparatus 190 may include:

a third detection module 1901, configured to perform signal detection on a transmission resource, where the transmission resource includes a resource set that is used for data transmission, or the transmission resource includes a first resource subset of the resource set;

a third determining module 1902, configured to determine a second resource and a third resource as first candidate resources, where the second resource is a resource that is in the transmission resource and whose SA information is not successfully decoded, and the third resource is a resource that is in the transmission resource, whose SA information is successfully decoded, and whose signal energy value is less than a corresponding preset threshold;

a first judging module 1903, configured to determine whether the first candidate resources are greater than L times of the transmission resource, where L is less than a first numerical value, and the first numerical value is equal to 0.2;

and a third transmission module 1904, configured to: when the first candidate resources are greater than L times of the transmission resource, transmit to-be-transmitted data by selecting an available resource from the first candidate resources.

This embodiment of the present invention provides the device-to-device data transmission apparatus. Before the third transmission module in the data transmission apparatus transmits the to-be-transmitted data, when the first judging module determines whether the first candidate resources are greater than L times of the transmission resource, L is less than 0.2 in a related technology, that is, L is less than 20% in the related technology. Therefore, a requirement that the first candidate resources are greater than L times of the transmission resource is greatly improved, and a probability of performing a step of adjusting a threshold and re-determining a candidate resource when the first candidate resources are not greater than L times of the transmission resource is reduced. Therefore, steps that need to be performed in a data transmission process are reduced, energy consumption of the communications device is reduced, and when the communications device is a handheld device, relatively long-time normal use of the handheld device can be ensured.

Figure 20:
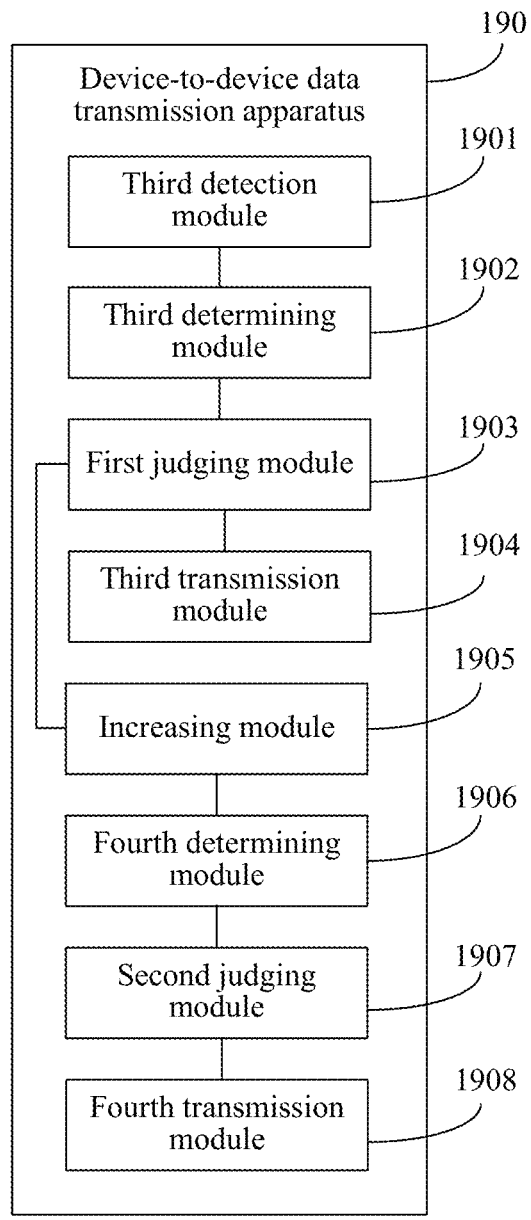
FIG. 20 is a schematic structural diagram of a device-to-device data transmission apparatus according to another embodiment of the present invention.

As shown in FIG. 20, on a basis of FIG. 19, the data transmission apparatus 190 may further include:

an increasing module 1905, configured to: when the first candidate resources are not greater than L times of the transmission resource, increase a preset threshold corresponding to each third resource by M, to obtain a target threshold corresponding to each third resource, where M is greater than a second numerical value, and the second numerical value is equal to 3 dB;

a fourth determining module 1906, configured to determine the second resource and a third resource whose signal energy value is less than the corresponding target threshold as second candidate resources;

a second judging module 1907, configured to determine whether the second candidate resources are greater than L times of the transmission resource; and a fourth transmission module 1908, configured to: when the second candidate resources are greater than L times of the transmission resource, transmit the to-be-transmitted data by selecting an available resource from the second candidate resources.

Figure 21:
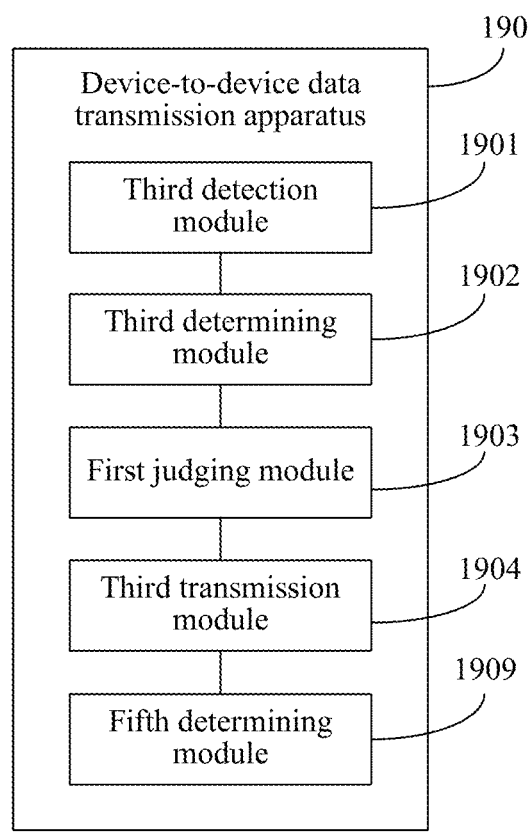
FIG. 21 is a schematic structural diagram of a device-to-device data transmission apparatus according to still another embodiment of the present invention.

As shown in FIG. 21, on a basis of FIG. 19, the data transmission apparatus 190 may further include:

a fifth determining module 1909, configured to determine reservation information, where the reservation information indicates that an available frequency domain resource of the to-be-transmitted data is reserved for at least twice.

Optionally, the reservation information includes scheduling assignment SA information, or the reservation information is configured by a base station for the communications device.

Optionally, the reservation information indicates at least one factor of a reservation period length, where the reservation period length is greater than a third numerical value, and the third numerical value is equal to a reservation period length in a vehicle-to-vehicle communications V2V technology.

Optionally, the factor of the reservation period length includes a parameter i, where i is greater than or equal to a fourth numerical value, and the fourth numerical value is equal to 10. At least one of first bit signaling and second bit signaling in the SA information indicates the parameter i, where the first bit signaling is bit signaling that is in SA information in the V2V technology and that indicates the parameter i, and the second bit signaling belongs to reserved bit signaling in the SA information.

Optionally, the factor of the reservation period length includes a parameter P, where P is greater than or equal to a fifth numerical value, and the fifth numerical value is equal to 100. The SA information or RRC signaling indicates the parameter P, a parameter P in SA information of to-be-transmitted data with a different priority is different, a parameter P in SA information of to-be-transmitted data of a different type of communications device is different, the communications device may be P-UE and V-UE, and a priority of to-be-transmitted data of the P-UE is higher than or equal to a priority of to-be-transmitted data of the V-UE.

Optionally, the factor of the reservation period length includes a parameter Q, the communications device may be P-UE and V-UE, a parameter Q of to-be-transmitted data of the P-UE is greater than 1, and a parameter Q of to-be-transmitted data of the V-UE is equal to 1.

The third transmission module 1904 is further configured to: transmit the to-be-transmitted data by selecting an available resource from the first candidate resources; determine whether a reselection condition is met; and when the reselection condition is met, transmit the to-be-transmitted data by reselecting a resource from the first candidate resources.

Optionally, the determining whether a reselection condition is met includes: determining whether transmission duration of the to-be-transmitted data is greater than or equal to preset duration; and when the transmission duration is less than the preset duration, determining that the reselection condition is not met; or when the transmission duration is greater than or equal to the preset duration, selecting a probability value from at least one preset reselection probability value as a target reselection probability value, where a value range of the at least one preset reselection probability value is in a preset range, the preset range is [0, 0.8], a minimum probability value in the at least one preset reselection probability value is greater than a sixth numerical value, the sixth numerical value is 0, a quantity of preset reselection probability values is less than a seventh numerical value, and the seventh numerical value is 5, and determining whether the reselection condition is met based on the target reselection probability value.

The third detection module 1901 is further configured to perform signal detection on a transmission resource in a time period greater than one second.

Optionally, a detection energy threshold corresponding to any two of at least two data priorities is configured on the communications device. A preset threshold corresponding to a resource is a detection energy threshold corresponding to a priority of data being transmitted on the resource and a priority of the to-be-transmitted data, the communications device may be P-UE and V-UE, and a priority of to-be-transmitted data of the P-UE is higher than or equal to a priority of to-be-transmitted data of the V-UE. A priority of first to-be-transmitted data of the P-UE is a first priority, a priority of second to-be-transmitted data of the V-UE is a second priority, a third priority is different from the first priority and the second priority, the first priority and the third priority are corresponding to a first detection energy threshold, the second priority and the third priority are corresponding to a second detection energy threshold, and the first detection energy threshold is greater than or equal to the second detection energy threshold.

Optionally, the SA information of the to-be-transmitted data indicates a type of the communications device, priorities of to-be-transmitted data of all P-UEs are the same, and are all higher than a priority of to-be-transmitted data of any V-UE, and the first detection energy threshold is greater than the second detection energy threshold.

Optionally, the SA information of the to-be-transmitted data indicates a priority of each piece of to-be-transmitted data, a priority of each type of to-be-transmitted data is different, a priority of to-be-transmitted data of each P-UE is higher than a priority of to-be-transmitted data of any V-UE, and the first detection energy threshold is greater than or equal to the second detection energy threshold.

Optionally, the SA information of the to-be-transmitted data indicates a priority of each piece of to-be-transmitted data, a priority of to-be-transmitted data of first P-UE is the same as a priority of to-be-transmitted data of V-UE, a priority of to-be-transmitted data of second P-UE is higher than the priority of the to-be-transmitted data of the V-UE, when the priority of the to-be-transmitted data of the first P-UE is the first priority, the first detection energy threshold is equal to the second detection energy threshold, and when the priority of the to-be-transmitted data of the second P-UE is the first priority, the first detection energy threshold is greater than the second detection energy threshold.

Optionally, the SA information of the to-be-transmitted data indicates a priority of each piece of to-be-transmitted data, a priority of each type of to-be-transmitted data is different, and when a type of to-be-transmitted data of P-UE is the same as a type of to-be-transmitted data of V-UE, a priority of the to-be-transmitted data of the P-UE is higher than a priority of the to-be-transmitted data of the V-UE.

The third transmission module 1904 is further configured to transmit to-be-transmitted data with Y repetitions by selecting an available resource from the first candidate resource, where Y is greater than an eighth numerical value, and the eighth numerical value is equal to 2. During each repetition prior to $Y^{th}$ repetition, a time interval between this repetition and next repetition is indicated in SA information, and during the $Y^{th}$ repetition, a time interval between the $Y^{th}$ repetition and each repetition prior to the $Y^{th}$ repetition is indicated in SA information.

The third transmission module 1904 is further configured to transmit to-be-transmitted data with Y repetitions by selecting an available resource from the first candidate resource, where Y is greater than an eighth numerical value, Y repetitions are grouped into Z groups of repetitions, Z is an integer greater than or equal to 2, the number of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition and a time interval between the last repetition and first repetition in a next group of repetitions are indicated in SA information.

The third transmission module 1904 is further configured to transmit to-be-transmitted data with Y repetitions by selecting an available resource from the first candidate resource, where Y is greater than an eighth numerical value, Y repetitions are grouped into Z groups of repetitions, Z is an integer greater than or equal to 2, the number of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition is indicated in SA information; in each group of repetitions that is not a first group of repetitions, during first repetition, a time interval between the first repetition and last repetition in a previous group of repetitions is indicated in SA information; and in each group of repetitions that is not a last group of repetitions, during last repetition, a time interval between the last repetition and first repetition in a next group of repetition is indicated in SA information.

This embodiment of the present invention provides the device-to-device data transmission apparatus. Before the third transmission module in the data transmission apparatus transmits the to-be-transmitted data, when the first judging module determines whether the first candidate resources are greater than L times of the transmission resource, L is less than 0.2 in a related technology, that is, L is less than 20% in the related technology. Therefore, a requirement that the first candidate resources are greater than L times of the transmission resource is greatly improved, and a probability of performing a step of adjusting a threshold and re-determining a candidate resource when the first candidate resources are not greater than L times of the transmission resource is reduced. Therefore, steps that need to be performed in a data transmission process are reduced, energy consumption of the communications device is reduced, and when the communications device is a handheld device, relatively long-time normal use of the handheld device can be ensured.

Further, an embodiment of the present invention provides a device-to-device data transmission apparatus, where the device-to-device data transmission apparatus is used for the communications device V-UE in FIG. 1, and the data transmission apparatus may include a sixth determining module and a fifth transmission module. The sixth determining module is configured to determine reservation information, where the reservation information indicates a factor of a reservation period length. The fifth transmission module is configured to transmit to-be-transmitted data based on the reservation information.

Optionally, the factor of the reservation period length includes a parameter i, where i is greater than 0 and less than 1. Optionally, the factor of the reservation period length includes a parameter P, where P is less than 100. Optionally, the parameter P is related to a priority of the to-be-transmitted data; or the parameter P is related to a service period of the to-be-transmitted data; or the parameter P is related to a transmission delay of the to-be-transmitted data. Optionally, the factor of the reservation period length includes a parameter Q, where Q is greater than 0 and less than 1.

Figure 22:
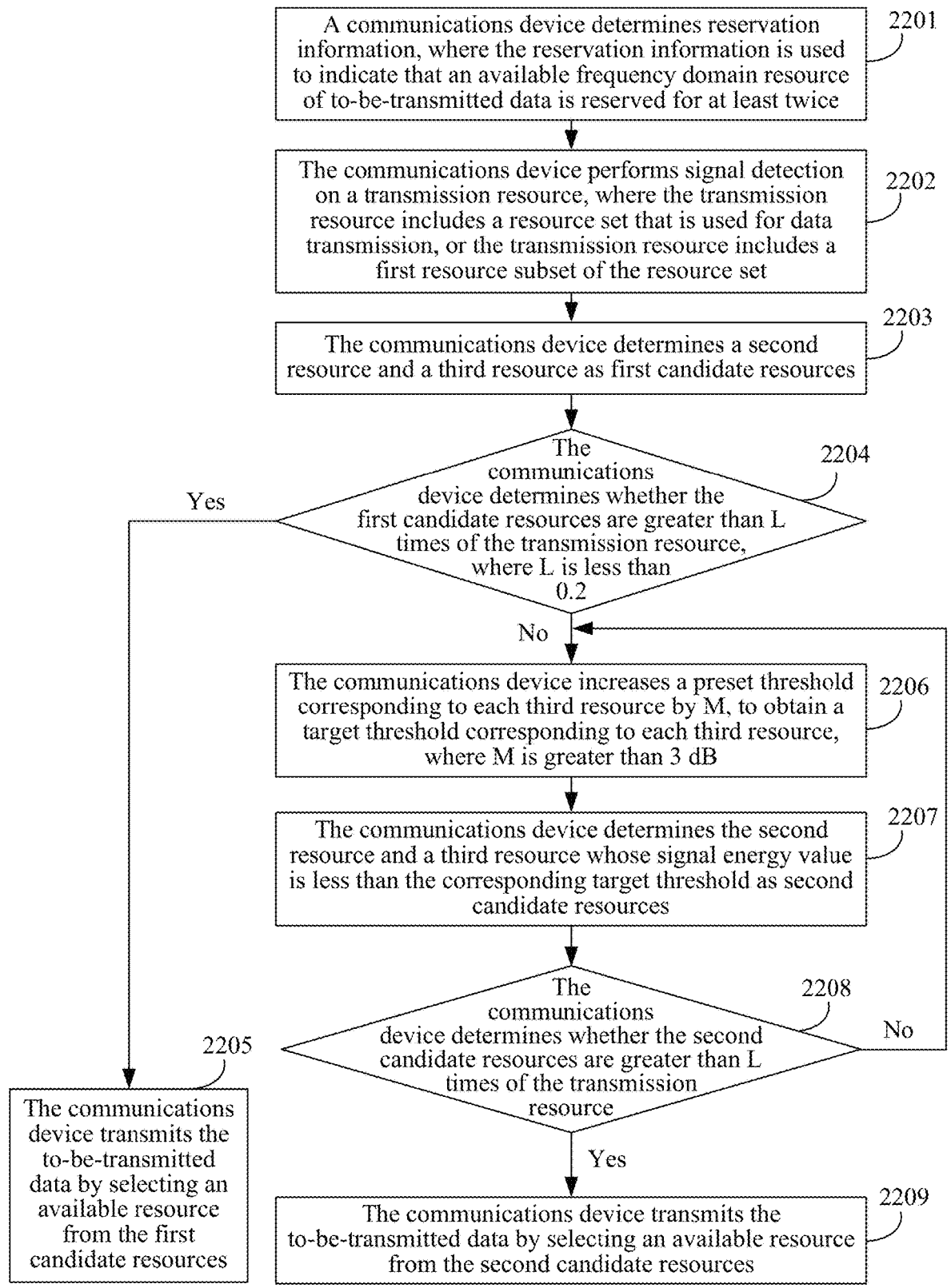
FIG. 22 is a flowchart of another device-to-device data transmission method according to an embodiment of the present invention.

As shown in FIG. 22, an embodiment of the present invention provides another device-to-device data transmission method. The data transmission method may be used for the communications device P-UE in FIG. 1. The data transmission method may be implemented by executing the program 2020 by the processor 201 in FIG. 2. The data transmission method may include the following steps.

Step 2201: The communications device determines reservation information, where the reservation information indicates that an available frequency domain resource of to-be-transmitted data is reserved for at least twice, and performs step 2202.

Specifically, step 2201 may be implemented by the fifth determining module 1909 in FIG. 21. For example, the reservation information includes SA information. In step 2201, the communications device may obtain the SA information. Alternatively, the reservation information may be configured by a base station or another higher layer for the communications device. In step 2201, the communications device may directly determine the reservation information based on a pre-configuration. It should be noted that, the reservation information may be used to indicate that the available frequency domain resource of the to-be-transmitted data is reserved for at least twice. In a related technology, SA information sent by V-UE can be merely used to indicate that an available frequency domain resource of to-be-transmitted data is reserved for once. However, for P-UE, to reduce power consumption and reduce data transmission complexity, a quantity of resource reservation times of the P-UE may be set to at least twice, for example, five times. In this way, the P-UE can periodically send five data packets on a currently selected frequency domain resource.

Optionally, the reservation information may be used to indicate at least one factor of a reservation period length, where the reservation period length may be greater than a reservation period length in a vehicle-to-vehicle communications V2V technology. In other words, an objective of reducing P-UE power consumption is achieved by increasing the reservation period length.

In a first aspect, the factor of the reservation period length may include a parameter i, where i is greater than or equal to 10. At least one of first bit signaling and second bit signaling in the SA information may be used to indicate the parameter i, where the first bit signaling is bit signaling that is in SA information in the V2V technology and that indicates the parameter i, and the second bit signaling belongs to reserved bit signaling in the SA information.

In a second aspect, the factor of the reservation period length includes a parameter P, where P is greater than or equal to 100. The SA information or radio resource control (RRC) signaling indicates the parameter P, a parameter P in SA information of to-be-transmitted data with a different priority is different, a parameter P in SA information of to-be-transmitted data of a different type of communications device is different, the communications device may be P-UE and V-UE, and a priority of to-be-transmitted data of the P-UE is higher than or equal to a priority of to-be-transmitted data of the V-UE.

In a third aspect, the factor of the reservation period length includes a parameter Q, a parameter Q of to-be-transmitted data of P-UE is greater than 1, and a parameter Q of to-be-transmitted data of V-UE is equal to 1. In other words, when the parameter Q is equal to 1, the communications device that sends data is V-UE, and when Q is greater than 1, the communications device that sends data is P-UE.

Optionally, all the factors i, P, and Q of the reservation period length may be pre-defined, or may be configured by a base station or another higher layer for UE.

Step 2202: The communications device performs signal detection on a transmission resource, where the transmission resource includes a resource set that is used for data transmission, or the transmission resource includes a first resource subset of the resource set, and performs step 2203.

Specifically, step 2202 may be implemented by the third detection module 1901 in FIG. 19, FIG. 20, or FIG. 21. In step 2202, the communications device may perform signal detection on the transmission resource in a time period greater than one second. In a related technology, a time domain length of a time period (also referred to as a sensing window) for transmission resource detection is one second. P-UE has a larger data packet transmission period and lower transmission frequency. Therefore, to ensure data transmission reliability, a length of a sensing window of the P-UE correspondingly becomes greater, for example, greater than one second, so that the P-UE can perform resource detection and selection on more resources, thereby ensuring data transmission reliability.

Step 2203: The communications device determines a second resource and a third resource as first candidate resources, and performs step 2204.

Specifically, step 2203 may be implemented by the third determining module 1902 in FIG. 19, FIG. 20, or FIG. 21. For example, the second resource is a resource that is in the transmission resource and whose SA information is not successfully decoded, and the third resource is a resource that is in the transmission resource, whose SA information is successfully decoded, and whose signal energy value is less than a corresponding preset threshold. A detection energy threshold corresponding to any two of at least two data priorities may be configured on the communications device, a preset threshold corresponding to a resource is a detection energy threshold corresponding to a priority of data being transmitted on the resource and a priority of the to-be-transmitted data, and a priority of to-be-transmitted data of the P-UE is higher than or equal to a priority of to-be-transmitted data of the V-UE. For example, a priority of first to-be-transmitted data of the P-UE is a first priority, a priority of second to-be-transmitted data of the V-UE is a second priority, a third priority is different from the first priority and the second priority, the first priority and the third priority are corresponding to a first detection energy threshold, the second priority and the third priority are corresponding to a second detection energy threshold, and the first detection energy threshold is greater than or equal to the second detection energy threshold.

The priority of the to-be-transmitted data of the P-UE is higher than the priority of the to-be-transmitted data of the V-UE, and the first detection energy threshold is greater than the second detection energy threshold. Therefore, a size of an available resource determined by the P-UE is increased, a probability of determining that there is an available resource is increased, data transmission efficiency is improved, and energy consumption of the P-UE is reduced.

In a first aspect, the SA information of the to-be-transmitted data may be used to indicate a type of the communications device, priorities of to-be-transmitted data of all P-UEs are the same, and are all higher than a priority of to-be-transmitted data of any V-UE, and the first detection energy threshold is greater than the second detection energy threshold. In other words, the communications device may determine a priority of the to-be-transmitted data corresponding to the SA information based on the type of the communications device indicated by the SA information.

In a second aspect, the SA information of the to-be-transmitted data indicates a priority of each piece of to-be-transmitted data, a priority of each type of to-be-transmitted data is different, a priority of to-be-transmitted data of each P-UE is higher than a priority of to-be-transmitted data of any V-UE, and the first detection energy threshold is greater than or equal to the second detection energy threshold.

In a third aspect, the SA information of the to-be-transmitted data indicates a priority of each piece of to-be-transmitted data, a priority of to-be-transmitted data of first P-UE is the same as a priority of to-be-transmitted data of V-UE, a priority of to-be-transmitted data of second P-UE is higher than the priority of the to-be-transmitted data of the V-UE, when the priority of the to-be-transmitted data of the first P-UE is the first priority, the first detection energy threshold is equal to the second detection energy threshold, and when the priority of the to-be-transmitted data of the second P-UE is the first priority, the first detection energy threshold is greater than the second detection energy threshold.

For example, when the P-UE has a priority the same as those of some V-UEs, the P-UE may reuse a bit that is in SA information in the related technology and that indicates a priority. For example, if the P-UE transmits a service with a priority 3 in Table 2, the P-UE may have a priority the same as the priority 3 of the V-UE, and reuse a bit of the priority 3 of the V-UE.

When a priority of to-be-transmitted data of the P-UE is higher than priorities of to-be-transmitted data of all V-UEs, a UE type may be indicated in the SA information in the first aspect, so as to determine that the communications device is P-UE, and determine that the priority of the to-be-transmitted data sent by the P-UE is higher than all priorities recorded in Table 2. Alternatively, an energy threshold corresponding to the priority of the to-be-transmitted data of the P-UE and a priority of any to-be-transmitted data may be set to be greater than all energy thresholds recorded in Table 2. For example, the energy threshold corresponding to the priority of the to-be-transmitted data of the P-UE and the priority of any to-be-transmitted data may be set to 1 dBm.

Alternatively, if in priorities of to-be-transmitted data of the P-UE, there are w priorities higher than priorities of to-be-transmitted data of all V-UEs, and the other priorities are the same as those of to-be-transmitted data of some V-UEs, w priorities and energy thresholds corresponding to the w priorities may be added to Table 2, so that Table 2 is changed from an 8*8 table to an (8+w)*(8+w) table. The (8+w)*(8+w) table may be shown as Table 3. An example of energy thresholds corresponding to every two priorities is not provided in Table 3.

TABLE 3

| Priority of UE-1 | Priority of UE-2 | | | | | | | | |
|---|---|---|---|---|---|---|---|---|---|
| | Priority 1 | Priority 2 | Priority 3 | Priority 4 | Priority 5 | Priority 6 | Priority 7 | Priority 8 | ... Priority w |
| Priority 1 | 1 | 2 | 3 | 4 | 5 | 6 | 7 | 8 | ... ... |
| Priority 2 | 9 | 10 | 11 | 12 | 13 | 14 | 15 | 16 | ... ... |
| Priority 3 | 17 | 18 | 19 | 20 | 21 | 22 | 23 | 24 | ... ... |
| Priority 4 | 25 | 26 | 27 | 28 | 29 | 30 | 31 | 32 | ... ... |
| Priority 5 | 33 | 34 | 35 | 36 | 37 | 38 | 39 | 40 | ... ... |
| Priority 6 | 41 | 42 | 43 | 44 | 45 | 46 | 47 | 48 | ... ... |
| Priority 7 | 49 | 50 | 51 | 52 | 53 | 54 | 55 | 56 | ... ... |
| Priority 8 | 57 | 58 | 59 | 60 | 61 | 62 | 63 | 64 | ... ... |
| ... | ... | ... | ... | ... | ... | ... | ... | ... | ... ... |
| Priority w | ... | ... | ... | ... | ... | ... | ... | ... | ... ... |

Optionally, the SA information of the to-be-transmitted data indicates a priority of each piece of to-be-transmitted data, a priority of each type of to-be-transmitted data is different, and when a type of to-be-transmitted data of P-UE is the same as a type of to-be-transmitted data of V-UE, a priority of the to-be-transmitted data of the P-UE is higher than a priority of the to-be-transmitted data of the V-UE.

Step 2204: The communications device determines whether the first candidate resources are greater than L times of the transmission resource, where L is less than 0.2. When the first candidate resources are greater than L times of the transmission resource, step 2205 is performed; and when the first candidate resources are less than or equal to L times of the transmission resource, step 2206 is performed.

Specifically, step 2204 may be implemented by the first judging module 1903 in FIG. 19, FIG. 20, or FIG. 21. L is less than 0.2 in the related technology, that is, L is less than 20% in the related technology. Therefore, a requirement that the first candidate resources are greater than L times of the transmission resource is greatly improved, and a probability of performing a step of adjusting a threshold and re-determining a candidate resource when the first candidate resources are not greater than L times of the transmission resource is reduced. Therefore, steps that need to be performed in a data transmission process are reduced, and energy consumption of the communications device is reduced. Therefore, when the communications device is a handheld device, relatively long-time normal use of the handheld device can be ensured.

Step 2205: The communications device transmits the to-be-transmitted data by selecting an available resource from the first candidate resources.

Specifically, step 2205 may be implemented by the third transmission module 1904 in FIG. 19, FIG. 20, or FIG. 21. For example, the available resource may be selected from the first candidate resources by using a method in the related technology, and the to-be-transmitted data may be transmitted on the available resource.

When the first candidate resources are greater than L times of the transmission resource, the to-be-transmitted data is transmitted by selecting the available resource from the first candidate resources. In a transmission process, whether a reselection condition is met is determined. Specifically, when transmission duration is less than preset duration (for example, a counter may be used for counting), it is determined that the reselection condition is not met; or when the transmission duration is greater than or equal to the preset duration, a probability value is selected from at least one preset reselection probability value as a target reselection probability value, where a value range of the at least one preset reselection probability value is in [0, 0.8], a minimum probability value in the at least one preset reselection probability value is greater than 0, and a quantity of preset reselection probability values is less than 5, and whether the reselection condition is met is determined based on the target reselection probability value. In other words, it is determined, based on the target reselection probability value, whether resource reselection needs to be performed on the available resource that is used for current transmission. When the reselection condition is met, reference may be made to the related technology for transmitting the to-be-transmitted data by reselecting a resource from the first candidate resources.

In this embodiment of the present invention, the value range of the at least one preset reselection probability value is in [0, 0.8], the minimum probability value in the at least one preset reselection probability value is greater than 0, and the quantity of preset reselection probability values is less than 5. In other words, a probability of skipping resource reselection is increased, and a probability of resource reselection is reduced. Therefore, steps that need to be performed by the handheld device in a data transmission process are reduced, and energy consumption of the handheld device is reduced.

Further, when the first candidate resources are greater than L times of the transmission resource, Y repetitions of the to-be-transmitted data may be performed by selecting an available resource from the first candidate resource, where Y is greater than 2. In this embodiment of the present invention, the number of repetitions is greater than 2 in the related technology. Therefore, data transmission reliability can be further improved.

Figure 23:
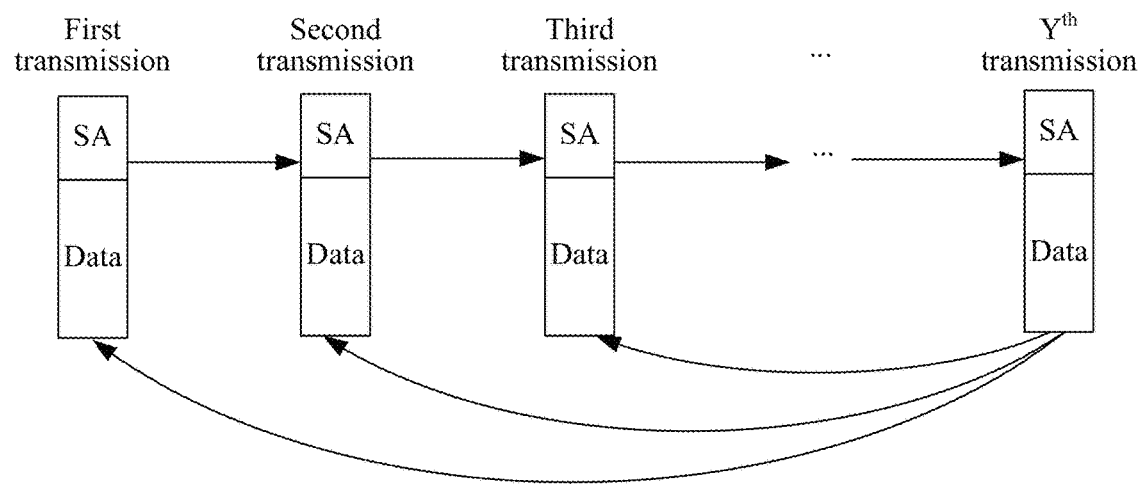
FIG. 23 is a schematic diagram of data repetition according to an embodiment of the present invention.

In one aspect, as shown in FIG. 23, during each repetition prior to $Y^{th}$ repetition, a time interval between this repetition and next repetition is indicated in SA information, and during the $Y^{th}$ repetition, a time interval between the $Y^{th}$ repetition and each repetition prior to the $Y^{th}$ repetition is indicated in SA information.

Figure 24:
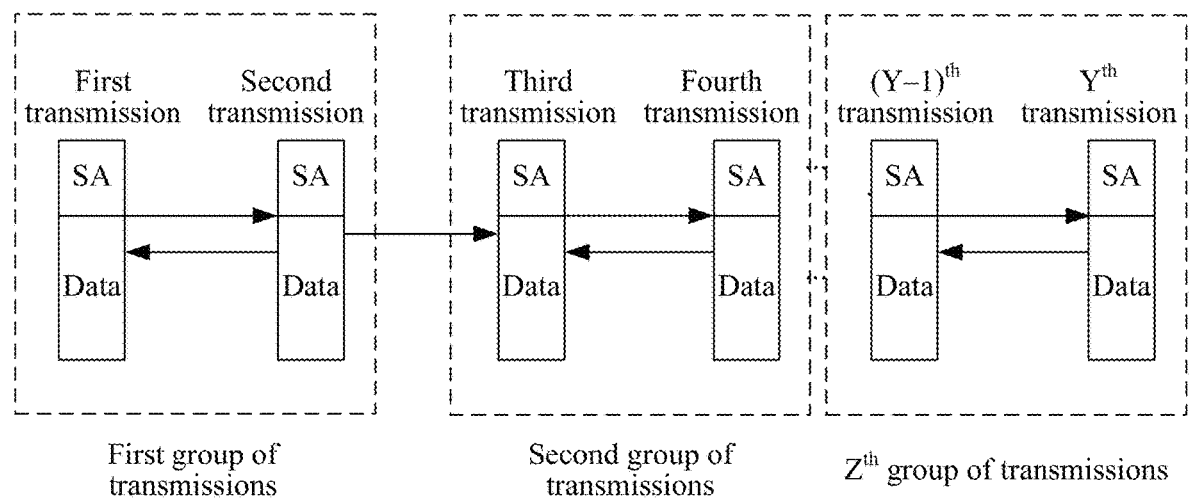
FIG. 24 is another schematic diagram of data repetition according to an embodiment of the present invention.

In another aspect, as shown in FIG. 24, the Y repetitions are grouped into Z groups of repetitions, where Z is an integer greater than or equal to 2, a quantity of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition and a time interval between the last repetition and first repetition in a next group of repetition are indicated in SA information.

Figure 25:
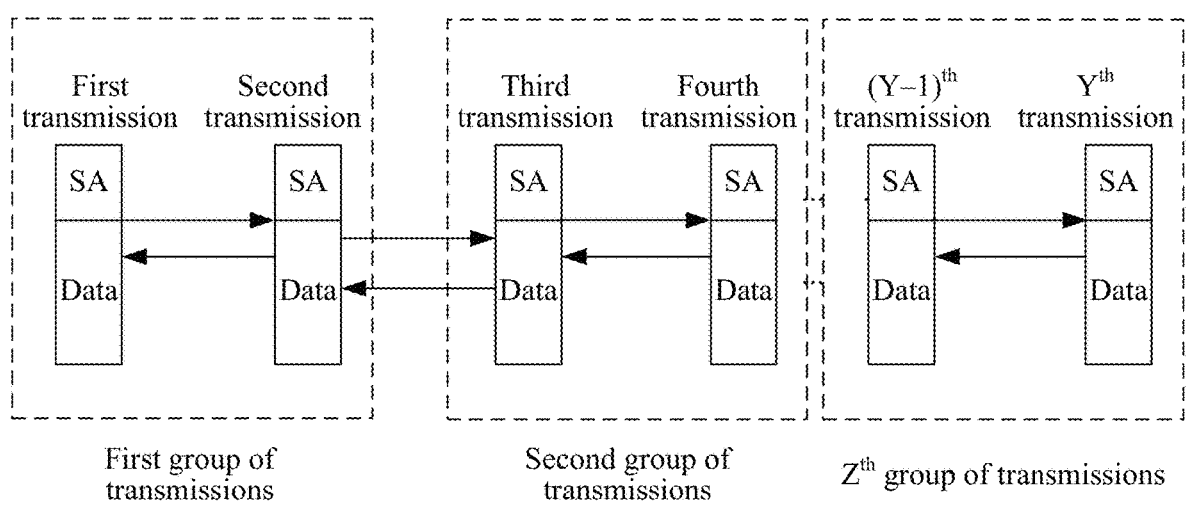
FIG. 25 is still another schematic diagram of data repetition according to an embodiment of the present invention.

In still another aspect, as shown in FIG. 25, the Y repetitions are grouped into Z groups of repetitions, where Z is an integer greater than or equal to 2, a quantity of repetitions in each group is greater than or equal to 1, in each group of repetitions, during each repetition that is not last repetition, a time interval between this repetition and next repetition is indicated in SA information, and during the last repetition, a time interval between the last repetition and at least one repetition prior to the last repetition is indicated in SA information; in each group of repetitions that is not a first group of repetitions, during first repetition, a time interval between the first repetition and last repetition in a previous group of repetitions is indicated in SA information; and in each group of repetitions that is not a last group of repetitions, during last repetition, a time interval between the last repetition and first repetition in a next group of repetitions is indicated in SA information.

Step 2206: The communications device increases a preset threshold corresponding to each third resource by M, to obtain a target threshold corresponding to each third resource, where M is greater than 3 dB, and performs step 2207.

Specifically, step 2206 may be implemented by the increasing module 1905 in FIG. 20.

Step 2207: The communications device determines the second resource and a third resource whose signal energy value is less than the corresponding target threshold as second candidate resources, and performs step 2208.

Specifically, step 2207 may be implemented by the fourth determining module 1906 in FIG. 20. Because M is greater than a step value of 3 dB in the related technology, a requirement that the re-determined second candidate resources are greater than L times of the transmission resource is greatly improved, and a quantity of times of repeatedly performing step 2206 is reduced. Therefore, steps that need to be performed in a data transmission process are reduced, and energy consumption of the communications device is reduced. Therefore, when the communications device is a handheld device, relatively long-time normal use of the handheld device can be ensured.

Step 2208: The communications device determines whether the second candidate resources are greater than L times of the transmission resource. When the second candidate resources are greater than L times of the transmission resource, step 2209 is performed; and when the second candidate resources are less than or equal to L times of the transmission resource, step 2206 is performed.

Specifically, step 2208 may be implemented by the second judging module 1907 in FIG. 20.

Step 2209: The communications device transmits the to-be-transmitted data by selecting an available resource from the second candidate resources.

Specifically, step 2209 may be implemented by the fourth transmission module 1908 in FIG. 20. For a specific step of transmitting data by selecting an available resource from the second candidate resources, refer to step 2205, and details are not described herein in this embodiment of the present invention.

This embodiment of the present invention provides the device-to-device data transmission method. Before the to-be-transmitted data is transmitted, when it is determined in advance whether the first candidate resources are greater than L times of the transmission resource, L is less than 0.2 in a related technology, that is, L is less than 20% in the related technology. Therefore, a requirement that the first candidate resources are greater than L times of the transmission resource is greatly improved, and a probability of performing a step of adjusting a threshold and re-determining a candidate resource when the first candidate resources are not greater than L times of the transmission resource is reduced. Therefore, steps that need to be performed in a data transmission process are reduced, and energy consumption of the communications device is reduced. Therefore, when the communications device is a handheld device, relatively long-time normal use of the handheld device can be ensured.

An embodiment of the present invention provides a device-to-device data transmission system, where the device-to-device data transmission system may include a communications device, and the communications device may include the device-to-device data transmission apparatus shown in FIG. 2, FIG. 3, FIG. 4, FIG. 19, FIG. 20, or FIG. 21.

It should be noted that a chronological order of steps of the data transmission method provided in the embodiments of the present invention may be properly adjusted, and the steps may also be correspondingly added or deleted according to a situation. Any variation readily figured out by a person skilled in the art within the technical scope disclosed in the present invention may fall within the protection scope of the present invention.

It may be clearly understood by a person skilled in the art that, for the purpose of convenient and brief description, the foregoing described device-to-device data transmission apparatus embodiments, device-to-device data transmission system embodiment, and device-to-device data transmission method embodiments may be mutually referenced, and certain details may not be repeated.

The foregoing descriptions are merely example embodiments of the present invention, but are not intended to limit the present invention. Any modification, equivalent replacement, and improvement made without departing from the principle of the present invention may fall within the protection scope of the present invention.

Additionally, statements made herein characterizing the invention refer to an embodiment of the invention and not necessarily all embodiments.

What is claimed is:

1. A device-to-device data transmission method, comprising:
   determining, by a device-to-device data transmission apparatus, reservation information, where the reservation information indicates a factor of a reservation period length, wherein the factor of the reservation period length includes a parameter i, and i is greater than 0 and less than 1; and
   transmitting, by the device-to-device data transmission apparatus, data based on the reservation information.

2. The method according to claim 1, wherein at least one of first bit signaling or second bit signaling in scheduling assignment (SA) information indicates the parameter i, wherein the first bit signaling corresponds to a vehicle-to-vehicle (V2V) communications technology, and the second bit signaling belongs to reserved bit signaling in the SA information.

3. The method according to claim 2, wherein the factor of the reservation period length includes a parameter P, where P is less than 100.

4. The method according to claim 1, wherein the factor of the reservation period length includes a parameter P, where P is less than 100.

5. The method according to claim 4, wherein Radio Resource Control (RRC) signaling indicates the parameter P.

6. The method according to claim 1, wherein the reservation information is indicated by scheduling assignment (SA) information or Radio Resource Control (RRC) signaling.

7. A device-to-device data transmission apparatus, comprising:
   at least one processor, configured to determine reservation information, wherein the reservation information indicates a factor of a reservation period length, wherein the factor of the reservation period length includes a parameter i, and i is greater than 0 and less than 1; and
   a transmitter, configured to transmit data based on the reservation information or receive data based on the reservation information.

8. The apparatus according to claim 7, wherein at least one of first bit signaling or second bit signaling in scheduling assignment (SA) information indicates the parameter i, wherein the first bit signaling corresponds to a vehicle-to-vehicle (V2V) communications technology, and the second bit signaling belongs to reserved bit signaling in the SA information.

9. The apparatus according to claim 8, wherein the factor of the reservation period length includes a parameter P, where P is less than 100.

10. The apparatus according to claim 7, wherein the factor of the reservation period length includes a parameter P, where P is less than 100.

11. The apparatus according to claim 10, wherein Radio Resource Control (RRC) signaling indicates the parameter P.

12. The apparatus according to claim 7, wherein the reservation information is indicated by scheduling assignment (SA) information or Radio Resource Control (RRC) signaling.

13. A non-transitory computer-readable medium having processor-executable instructions stored thereon, wherein the processor-executable instructions, when executed, facilitate:

determining reservation information, where the reservation information indicates a factor of a reservation period length, wherein the factor of the reservation period length includes a parameter i, and i is greater than 0 and less than 1; and transmitting data based on the reservation information.

14. The medium according to claim 13, wherein at least one of first bit signaling or second bit signaling in scheduling assignment (SA) information indicates the parameter i, the first bit signaling corresponds to a vehicle-to-vehicle (V2V) communications technology, and the second bit signaling belongs to reserved bit signaling in the SA information.

15. The medium according to claim 14, wherein the factor of the reservation period length includes a parameter P, where P is less than 100.

16. The medium according to claim 13, wherein the factor of the reservation period length includes a parameter P, where P is less than 100.

17. The medium according to claim 16, wherein Radio Resource Control (RRC) signaling indicates the parameter P.

18. The medium according to claim 13, wherein the reservation information is indicated by scheduling assignment (SA) information or Radio Resource Control (RRC) signaling.

* * * * *